(12) United States Patent
Caldwell et al.

(10) Patent No.: US 7,444,191 B2
(45) Date of Patent: Oct. 28, 2008

(54) PROCESS MODEL IDENTIFICATION IN A PROCESS CONTROL SYSTEM

(75) Inventors: John Caldwell, Austin, TX (US); Terrence L. Blevins, Round Rock, TX (US); Peter Wojsznis, Austin, TX (US); Wilhelm K. Wojsznis, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 471 days.

(21) Appl. No.: 11/243,862

(22) Filed: Oct. 4, 2005

(65) Prior Publication Data
US 2007/0078533 A1    Apr. 5, 2007

(51) Int. Cl.
*G05B 13/02* (2006.01)
(52) U.S. Cl. .......................................... 700/29; 700/52
(58) Field of Classification Search .................... 700/28, 700/29, 52, 37, 42, 44, 45, 50
See application file for complete search history.

(56) References Cited

U.S. PATENT DOCUMENTS

| | | |
|---|---|---|
| 4,029,122 A | 6/1977 | Jaegtnes |
| 4,313,465 A | 2/1982 | Holzem et al. |
| 4,376,450 A | 3/1983 | Fayfield et al. |
| 4,523,286 A | 6/1985 | Koga et al. |
| 4,542,649 A | 9/1985 | Charbonneau et al. |
| 4,555,766 A | 11/1985 | Wright |
| 4,590,963 A | 5/1986 | Gardner et al. |
| 4,615,722 A | 10/1986 | Steffan et al. |
| 4,617,960 A | 10/1986 | More |
| 4,641,235 A | 2/1987 | Shigemasa et al. |
| 4,660,416 A | 4/1987 | Charbonneau et al. |
| 4,672,529 A | 6/1987 | Kupersmit |

(Continued)

FOREIGN PATENT DOCUMENTS

DE          42 32 826          10/1993

(Continued)

OTHER PUBLICATIONS

Search Report under Section 17 issued in GB0619591.1 application by United Kingdom Patent Office on Jan. 29, 2007.

(Continued)

*Primary Examiner*—Albert DeCady
*Assistant Examiner*—Steven R Garland
(74) *Attorney, Agent, or Firm*—Marshall, Gerstein & Borun LLP

(57) ABSTRACT

Disclosed is a method of controlling and managing a process control system having a plurality of control loops. The method includes implementing a plurality of control routines to control operation of the plurality of control loops, respectively. The plurality of control routines may include at least one non-adaptive control routine. Operating condition data is then collected in connection with the operation of each control loop of the plurality of control loops, and a respective process model is identified for each control loop of the plurality of control loops from the respective operating condition data collected for each control loop of the plurality of control loops. In some embodiments, the identification of the respective process models may be automatic as a result of a detected process change or be on-demand as a result of an injected parameter change.

9 Claims, 16 Drawing Sheets

U.S. PATENT DOCUMENTS

| | | | |
|---|---|---|---|
| 4,690,003 | A | 9/1987 | McNennamy et al. |
| 4,693,113 | A | 9/1987 | McNennamy et al. |
| 4,694,390 | A | 9/1987 | Lee |
| 4,694,391 | A | 9/1987 | Guttag et al. |
| 4,712,071 | A | 12/1987 | Charbonneau et al. |
| 4,742,713 | A | 5/1988 | Abe et al. |
| 4,831,873 | A | 5/1989 | Charbonneau et al. |
| 4,833,593 | A | 5/1989 | Takeuchi et al. |
| 4,858,103 | A | 8/1989 | Takeuchi et al. |
| 4,908,774 | A | 3/1990 | Lund et al. |
| 4,908,775 | A | 3/1990 | Palusamy et al. |
| 4,916,628 | A | 4/1990 | Kugler |
| 4,926,903 | A | 5/1990 | Kawai |
| 4,949,288 | A | 8/1990 | Bookout |
| 4,976,144 | A | 12/1990 | Fitzgerald |
| 4,977,778 | A | 12/1990 | Nafziger et al. |
| 4,980,825 | A | 12/1990 | Tootell et al. |
| 5,000,040 | A | 3/1991 | Charbonneau et al. |
| 5,018,215 | A | 5/1991 | Nasr et al. |
| 5,043,863 | A | 8/1991 | Bristol et al. |
| 5,086,273 | A | 2/1992 | Leon |
| 5,109,692 | A | 5/1992 | Fitzgerald |
| 5,140,263 | A | 8/1992 | Leon |
| 5,154,080 | A | 10/1992 | Hill et al. |
| 5,159,547 | A | 10/1992 | Chand |
| 5,159,835 | A | 11/1992 | Nafziger et al. |
| 5,180,896 | A | 1/1993 | Gibby et al. |
| 5,197,328 | A | 3/1993 | Fitzgerald |
| 5,198,973 | A | 3/1993 | Steutermann |
| 5,228,342 | A | 7/1993 | McShane |
| 5,233,542 | A | 8/1993 | Hohner et al. |
| 5,251,148 | A | 10/1993 | Haines et al. |
| 5,253,185 | A | 10/1993 | Mutchler et al. |
| 5,272,621 | A | 12/1993 | Aoki et al. |
| 5,272,647 | A | 12/1993 | Hayes |
| 5,320,123 | A | 6/1994 | Corso et al. |
| 5,329,465 | A | 7/1994 | Arcella et al. |
| 5,329,956 | A | 7/1994 | Marriott et al. |
| 5,335,164 | A | 8/1994 | Gough, Jr. et al. |
| 5,337,262 | A | 8/1994 | Luthi et al. |
| 5,396,167 | A | 3/1995 | Leon |
| 5,414,648 | A | 5/1995 | Morgan et al. |
| 5,425,270 | A | 6/1995 | McDonald et al. |
| 5,433,245 | A | 7/1995 | Prather et al. |
| 5,451,923 | A | 9/1995 | Seberger et al. |
| 5,453,925 | A | 9/1995 | Wojsznis et al. |
| 5,461,559 | A | 10/1995 | Heyob et al. |
| 5,475,299 | A | 12/1995 | Leon |
| 5,477,149 | A | 12/1995 | Spencer et al. |
| 5,487,302 | A | 1/1996 | Casada et al. |
| 5,555,171 | A | 9/1996 | Sonehara et al. |
| 5,557,546 | A | 9/1996 | Fukai et al. |
| 5,564,470 | A | 10/1996 | Denmark et al. |
| 5,568,378 | A | 10/1996 | Wojsznis |
| 5,586,305 | A | 12/1996 | Eidson et al. |
| 5,587,899 | A | 12/1996 | Ho et al. |
| 5,625,552 | A | 4/1997 | Mathur et al. |
| 5,687,098 | A | 11/1997 | Grumstrup et al. |
| 5,748,467 | A | 5/1998 | Qin et al. |
| 5,966,679 | A | 10/1999 | Snowbarger et al. |
| 6,041,320 | A | 3/2000 | Qin et al. |
| 6,049,738 | A | 4/2000 | Kayama et al. |
| 6,128,541 | A | 10/2000 | Junk |
| 6,192,321 | B1 | 2/2001 | Grumstrup et al. |
| 6,249,712 | B1 | 6/2001 | Boiquaye |
| 6,330,484 | B1 | 12/2001 | Qin |
| 6,353,766 | B1 | 3/2002 | Weinzierl et al. |
| 6,445,962 | B1 | 9/2002 | Blevins et al. |
| 6,577,908 | B1 | 6/2003 | Wojsznis et al. |
| 6,745,088 | B2 | 6/2004 | Gagne |
| 6,901,300 | B2 | 5/2005 | Blevins et al. |
| 2003/0088320 | A1 | 5/2003 | Sale |
| 2003/0195641 | A1 | 10/2003 | Wojsznis et al. |
| 2005/0149209 | A1 | 7/2005 | Wojsznis et al. |

FOREIGN PATENT DOCUMENTS

| | | |
|---|---|---|
| DE | 42 18 320 | 12/1993 |
| EP | 0 275 629 | 7/1988 |
| EP | 0 315 391 | 5/1989 |
| EP | 0 462 432 | 12/1991 |
| EP | 0 572 245 | 12/1993 |
| EP | 0 637 713 | 2/1995 |
| EP | 0 660 017 | 6/1995 |
| EP | 0 708 389 | 4/1996 |
| GB | 2 194 648 | 3/1988 |
| GB | 2 196 445 | 4/1988 |
| GB | 2 409 293 A | 6/2005 |
| JP | 62-89908 | 4/1987 |
| JP | 62-229 044 | 10/1987 |
| JP | 2003-293344 | 10/2003 |
| WO | WO-97/12300 | 4/1997 |
| WO | WO-97/16776 | 5/1997 |
| WO | WO-00/33209 | 6/2000 |

OTHER PUBLICATIONS

Beatty, "Intelligent Valve Based Process Sensing and Control," *ISA, 46 Advances in Instrumentation and Control*, No. 2, pp. 1175-1185 (1991).

Charbonneau, "Early Diagnosis of Motor Operated Valve Mechanical and Electrical Degradations," The American Society of Mechanical Engineers, 84-NE-16, (1984).

De Persis, et al., "Further Results on Switched Control of Linear Systems with Constraints," *Proceedings of the 41st IEEE Conference on Decision and Control*, Las Vegas, NV, USA, pp. 2810-2815 (2002).

Dimmick, et al., "Ultrasonic Leak Detection Cuts Valve Maintenance Costs," *Power Engineering*, pp. 35-38 (1986).

Examination Report under Section 18(3) issued by the United Kingdom Patent Office on Feb. 14, 2006 for GB Application No. 0408598.1.

Electronic Power Research Institute, "Improvements in Motor-Operated Valves," EPRI NP-4254 (1985).

Electronic Power Research Institute, "Key Valves Prioritization Study," EPRI NP-3611 (1984).

Fieldvue™, "Digital Valve Controller Type DVC5000 Series," Instruction Manual, (1995).

Fieldvue™, "Digital Vave Controller Type DVC5000 Series," Bulletin 62.1:DVC5000, (1994).

Fieldvue™, "Digital Valve Controller DVC5000 Series Remotely Accessible Information," Bulletin 62.1:DVC5000(S1), (1994).

Hägglund, et al., "Industrial Adaptive Controllers Based on Frequency Response Techniques," *Automatica*, vol. 27, No. 4, pp. 599-609 (1991).

Hanagud, et al., "Artificial Intelligence-Based Model-Adaptive Approach to Flexible Structure Control," American Institute of Aeronautics and Astronautics, Inc. vol. 13, No. 3 pp. 534-544 (1987).

Hespanha, et al., "Overcoming the Limitations of Adaptive Control by Means of Logic-Based Switching," *Systems and Control Letters*, 49, pp. 49-65 (2003).

Hespanha, et al., "Stabilization of Nonholonomic Integrators via Logic-Based Switching," *Automatica*, pp. 385-394 (1999).

International Search Report in PCT/US01/19706 dated Oct. 23, 2001.

International Search Report in PCT/US98/19375 dated Feb. 5, 1999.

International Search Report in PCT/US98/19430 dated Jan. 5, 1999.

Jadbabaie, et al., "Coordination of Groups of Mobile Autonomous Agents Using Nearest Neighbor Rules," *IEEE Transactions on Automatic Control*, 48(6), pp. 988-1001 (2003).

Liberzon, et al., "Basic Problems in Stability and Design of Switched Systems," *IEEE Control Systems Magazine*, pp. 59-70 (1999).

Liberzon, et al., "Stability of Switched Systems: A Lie-Algebraic Condition," *Systems and Control Letters*, vol. 37, pp. 117-122 (1999).

Morse, "A Bound for the Disturbance-to-Tracking-Error Gain of a Supervised Set-Point Control System," in *Perspectives in Control: Theory and Applications*, pp. 23-41, Dorothee Normand-Cyrot (ed.), Spring Verlag, New York, (1998).

Morse, et al., "Applications of Hysteresis Switching in Parameter Adaptive Control," *IEEE Transactions on Automatic Control*, 37(9) (1992).

Morse, "Control Using Logic-Based Switching," in *Trends in Control: A European Perspective*, Alberto Isidori (ed.), Springer Verlag, New York (1995).

Narendra, et al., "Adaptive Control Using Multiple Models", *IEEE Transactions on Automatic Control*, vol. 42, No. 2, pp. 171-187 (1997).

Pait, et al., "A Cyclic Seitching Strategy for Parameter-Adaptive Control," *IEEE Transactions on Automatic Control*, 39(6) (1994).

Search Report under Section 17(5) issued by the United Kingdom Patent Office on Aug. 18, 2004 for GB Application No. 0408598.1.

U.S. Appl. No. 06/913,193 entitled "Motor Current Signature Analysis Method for Diagnosing Motor-Operated Devices".

PROCESS MODEL IDENTIFICATION IN A PROCESS CONTROL SYSTEM

TECHNICAL FIELD

The present invention relates generally to process control systems and, more particularly, to the identification and application of process models in process control systems.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other of information pertaining to the field devices, and uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Some process control systems, such as the DeltaV® system sold by Fisher Rosemount Systems, Inc., headquartered in Austin, Tex., use function blocks or groups of function blocks referred to as modules located in the controller or in different field devices to perform control operations. In these cases, the controller or other device is capable of including and executing one or more function blocks or modules, each of which receives inputs from and/or provides outputs to other function blocks (either within the same device or within different devices), and performs some process operation, such as measuring or detecting a process parameter, controlling a device, or performing a control operation, such as the implementation of a proportional-derivative-integral (PID) control routine. The different function blocks and modules within a process control system are generally configured to communicate with each other (e.g., over a bus) to form one or more process control loops.

Process controllers are typically programmed to execute a different algorithm, sub-routine or control loop (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and an output block, such as an analog output (AO) function block.

Control routines, and the function blocks that implement such routines, have been configured in accordance with a number of control techniques, including PID control, fuzzy logic control, and model-based techniques such as a Smith Predictor or Model Predictive control (MPC). In model-based control techniques, the parameters used in the routines to determine the closed loop control response are based on the dynamic process response to changes in the manipulated or measured disturbances serving as inputs to the process. A representation of this response of the process to changes in process inputs may be characterized as a process model. For instance, a first-order parameterized process model may specify values for the gain, dead time, and time constant of the process.

One model-based technique, model predictive control (MPC), involves a number of step or impulse response models designed to capture the dynamic relationships between process inputs and outputs. With MPC techniques, the process model is directly used to generate the controller. When used in connection with processes that experience large changes in process dead time, process delay, etc., the MPC controller must be automatically regenerated using the models to match the current process condition. In such cases, a process model was accordingly identified at each of a number of operating conditions. The introduction of multiple process models and the requisite automatic generation of the controller to matching the current process condition undesirably increased the complexity of the process control system.

Process models have also been used to set tuning parameters of PID and other control schemes using adaptive control techniques, where the tuning of the PID (or other) controller is generally updated as a result of changes in the process model and a user-selected tuning rule. See, e.g., U.S. Pat. Publication No. 2003/0195641 entitled "State Based Adaptive Feedback Feedforward PID Controller" and U.S. Pat. No. 6,577,908 entitled "Adaptive Feedback/Feedforward PID Controller," the entire disclosures of which are hereby expressly incorporated by reference herein.

Despite the promise of improved control performance, the use of adaptive control techniques in the process industries has been limited, insofar as the techniques have often been difficult to implement in practice. As a practical matter, model identification has typically been part of a special function block designed specifically for adaptive control. Unfortunately, it is often difficult to determine which process control loops would benefit from the implementation of adaptive control, i.e., which loops should be selected for adaptive control capability. One reason involves the sheer number (e.g., hundreds) of control loops and instruments (e.g., thousands) that are monitored in a typical plant. But regardless of the size or complexity of the plant, conventional process control systems typically do not support the creation of process models for all of the control loops in the plant. Making matters worse, the manual testing necessary to identify new process models for all the control loops may not be practicably performed. For instance, the testing may require the application of one or more process perturbations that are incompatible with an on-line process.

In operation, the adaptive control techniques have provided limited diagnostic capabilities. More specifically, when the adaptive control schemes are selectively put into practice in process control, the identified process response is generally only used to establish the tuning of the control loop. As a result, the process control system may fail to provide an indication of an abnormal condition in the process or instrumentation that is causing control performance to suffer.

SUMMARY OF THE DISCLOSURE

In accordance with one aspect of the disclosure, a method is useful for controlling a process control system having a plurality of control loops. The method includes implementing a plurality of control routines to control operation of the plurality-of control loops, respectively, the plurality of control routines including at least one non-adaptive control routine, collecting operating condition data in connection with the operation of each control loop of the plurality of control loops, and identifying a respective process model for each control loop of the plurality of control loops from the respective operating condition data collected for each control loop of the plurality of control loops.

In some cases, the method further includes storing data indicative of the respective identified process models in a respective process model history for each control loop of the plurality of control loops. The method may also include examining the operating condition data to detect a change therein, and triggering the process model identification when the change is detected.

In some embodiments, the identification may be performed in response to a user command to calculate the process model based on the collected operating condition data. The collected operating condition data may then be indicative of a response to an injected parameter change applied as a result of the user command.

The operating condition data may be indicative of on-line operation of a process controlled via the operation of the plurality of control loops.

The method may further include monitoring the respective process models identified for each control loop to evaluate control loop performance. Alternatively or in addition, the method may also include analyzing the respective process models identified for each control loop to determine which control loops should utilize an adaptive control scheme. Alternatively or in addition, the method may still further include analyzing the respective process models identified for each control loop to diagnose control problems.

In accordance with another aspect of the disclosure, a method of controlling a process control system having a plurality of control routines includes collecting operating condition data during implementation of the plurality of control routines, detecting an event indicative of a process change in connection with a control routine of the plurality of control routines associated with the process change, identifying a process model for the control routine associated with the process change, and storing data indicative of the generated process model in developing a process model history for the control routine associated with the process change.

In some cases, the method further includes automatically collecting data for the identifying step upon detection of the event.

The method may also include identifying respective process models for each control routine of the plurality of control routines. The plurality of control routines may include a control routine that implements a non-adaptive control scheme.

BRIEF DESCRIPTION OF THE DRAWINGS

For a more complete understanding of the disclosure, reference should be made to the following detailed description and accompanying drawing figures, in which like reference numerals identify like elements in the figures, and in which.

Figure 1:
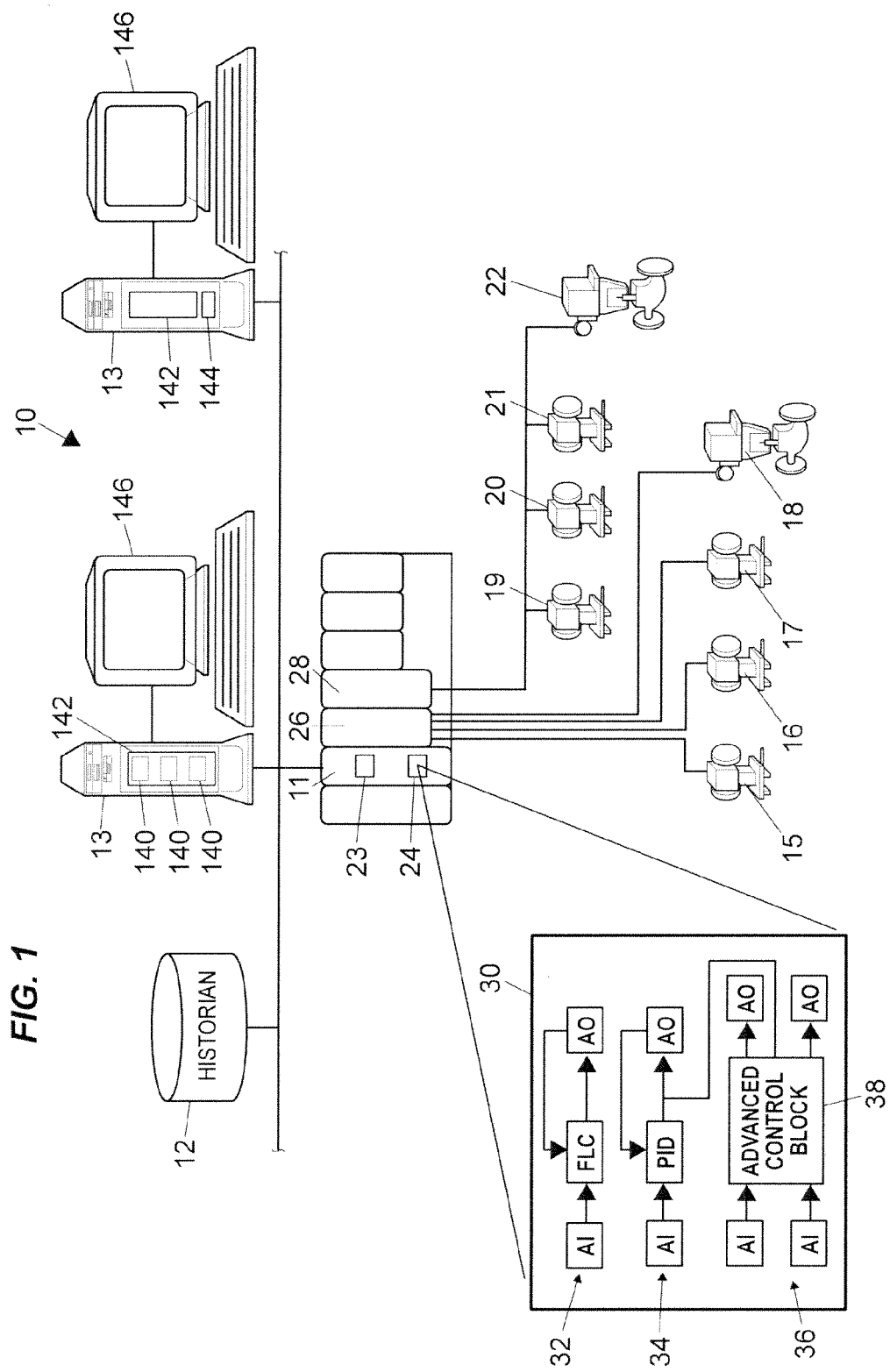
FIG. 1 is a schematic representation of a process control system including a controller configured with one or more control routines in accordance with one aspect of the disclosure.

While the disclosed system and method are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DESCRIPTION OF PREFERRED EMBODIMENTS

Disclosed herein are a process control system and method that implement a technique that automatically identifies process models for control loops in the process control system that are not necessarily currently utilizing a process model for adaptive control. The process models are created, therefore, for reasons other than (or in addition to) the implementation of adaptive control. For instance, the decision as to which control loops should have adaptive control applied thereto is made easier via evaluation of the process models identified via the disclosed technique.

In some cases, the identification of process models is extended to all control loops in the process control system. In this way, process models may be generated for every node of the process control system. But regardless of whether process models are being identified for every control loop or node in specific embodiments of the disclosed system, the extension of process model identification to non-adaptive control loops has a number of benefits, including, among others, on-demand controller tuning, abnormal condition monitoring and diagnostics.

In some cases, process control data is collected to identify a number of process models for a control loop, thereby generating a history of process models. The process control data giving rise to the process model history may be generated during, in connection with, and as a result of, the day-to-day operation of the process. In these cases, the resulting process model history provides a representation of the recent, on-line performance of the control loop. Special testing or test procedures are then not required.

Where the control loop is implementing an adaptive control scheme (e.g., an adaptive PID control), then the process model history may indicate whether adaptive control is appropriate for the current operating conditions or, more generally, for the control loop itself. Conversely, the process model history for a non-adaptive control loop may also indicate that an adaptive control scheme may be beneficial.

In some cases, the process models may be identified (e.g., generated) by a routine embedded in the process controller implementing the control routines. To this end, the controller may be triggered by process changes to store process control data to support the generation of the process model(s). Process changes or other events that act as triggers may include a set point change, a perturbation automatically injected in the controller output, or any other change to the open or closed control loop. In these and other ways, a process model identification routine may be continuously implemented by the controller (or other element(s) of the system) to capture the process control data throughout day-to-day operation. Furthermore, the process models may thus be identified automatically upon the detection of the process change (or other trigger event), with all of the calculations occurring in the background while the process remains on-line.

Once identified and/or stored, the process model(s) may be analyzed, processed, applied or otherwise utilized to support a number of process control tasks implemented in connection with managing the process control system, including performance monitoring, on-demand tuning, control algorithm recommendations, loop response simulation, process monitoring, control diagnostics, and adaptive control. For example, and as described below, the process models may be used to calculate a model-based performance index for the control loop for which it was identified.

While the process models identified via the disclosed technique may also be relied upon to implement model-based control schemes (e.g., adaptive control), implementation of the disclosed technique is not limited to any particular type of control loop, process controller, process control system or process control network architecture. Moreover, the disclosed technique may be implemented by a number of elements of the process control system, either individually or in distributed fashion, and on one or more levels (e.g., the process controller level, control loop level, etc.). Still further, the disclosed technique is not limited to any particular process model type and, for example, may utilize any parameterized dynamic model of the process.

Referring now to FIG. 1, a process control system 10 includes a process controller 11 connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data. The data historian 12 may be separate from (as illustrated in FIG. 1) or a part of one of the workstations 13. The controller 11, which may be, by way of example, the DeltaV controller sold by Fisher-Rosemount Systems, Inc., is communicatively connected to the host computers 13 and to the data historian 12 via, for example, an ethernet connection or any other desired communication network. The controller 11 is also communicatively connected to the field devices 15-22 using any desired hardware and software associated with, for example, standard 4-20 ma devices and/or any smart communication protocol such as the FOUNDATION Fieldbus protocol, the HART protocol, etc.

The field devices 15-22 may be any types of devices, such as sensors, valves, transmitters, positioners, etc., while the I/O cards 26 and 28 may be any types of I/O devices conforming to any desired communication or controller protocol. In the embodiment illustrated in FIG. 1, the field devices 15-18 are standard 4-20 ma devices that communicate over analog lines to the I/O card 26 while the field devices 19-22 are smart devices, such as Fieldbus field devices, that communicate over a digital bus to the I/O card 28 using Fieldbus protocol communications. Of course, the field devices 15-22 could conform to any other desired standard(s) or protocols, including any standards or protocols developed in the future.

The controller 11 includes a processor 23 that implements or oversees one or more process control routines (stored in a memory 24), which may include control loops, stored therein or otherwise associated therewith and communicates with the devices 15-22, the host computers 13 and the data historian 12 to control a process in any desired manner. It should be noted that any control routines or modules described herein may have parts thereof implemented or executed by different controllers or other devices if so desired. Likewise, the control routines or modules described herein to be implemented within the process control system 10 may take any form, including software, firmware, hardware, etc. For the purpose of this disclosure, a process control module may be any part or portion of a process control system including, for example, a routine, a block or any element thereof, stored on any computer readable medium. Control routines, which may be modules or any part of a control procedure such as a subroutine, parts of a subroutine (such as lines of code), etc., may be implemented in any desired software format, such as using object oriented programming, using ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 11 may be configured to implement a control strategy or control routine in any desired manner.

In some embodiments, the controller 11 implements a control strategy using what are commonly referred to as function blocks, wherein each function block is an object or other part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which can be the case with Fieldbus devices. While the description of the control system is provided herein using a function block control strategy, the disclosed techniques and system may also be implemented or designed using other conventions, such as ladder logic, sequential function charts, etc. or using any other desired programming language or paradigm.

As illustrated by the exploded block 30 of FIG. 1, the controller 11 may include a number of single-loop control routines, illustrated as routines 32 and 34, and, if desired, may implement one or more advanced control loops, illustrated as control loop 36. Each such loop is typically referred to as a control module. The single-loop control routines 32 and 34 are illustrated as performing single loop control using a single-input/single-output fuzzy logic control block and a single-input/single-output PIE) control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to one or more AI function blocks and outputs communicatively connected to one or more AO function blocks, although the inputs and outputs of the advanced control block 38 may be connected to any other desired function blocks or control elements to receive other types of inputs and to provide other types of control outputs. The advanced control block 38 may be any type of model predictive control (MPC) block, neural network modeling or control block, a multi-variable fuzzy logic control block, a real-time-optimizer block, etc. It will be understood that the function blocks illustrated in FIG. 1, including the advanced control block 38, can be executed by the controller 11 or, alternatively, can be located in and executed by any other processing device, such as one of the workstations 13 or even one of the field devices 19-22.

Figure 2:
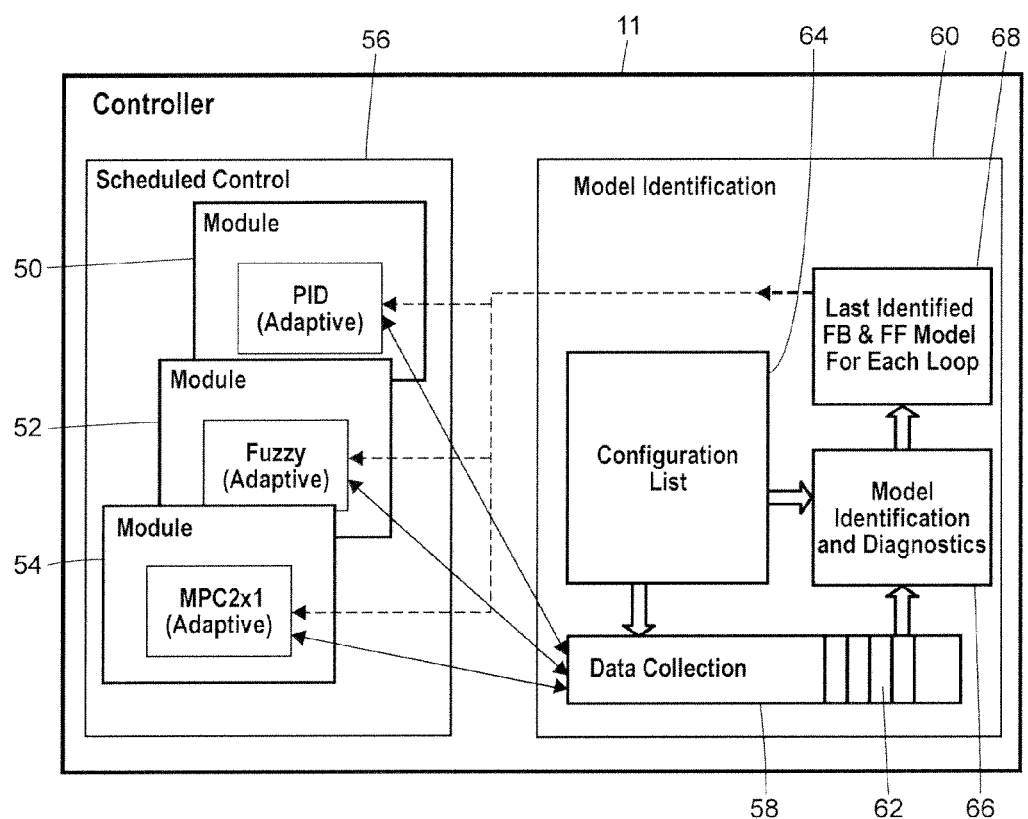
FIG. 2 is a schematic representation of the controller of FIG. 1 in accordance with an embodiment having a model identification routine in communication with a number of function blocks.

With reference now to FIG. 2, the controller 11 may have any number of control modules 50, 52, and 54 that define and implement corresponding process control routines to control the on-line process. Thus, the control modules 50, 52 and 54 may be implemented in connection with an operational environment or mode controlled by a module 56 and generally associated with normal, scheduled control of the process. As described above, each control module 50, 52 and 54 may have any number of function blocks, including control function blocks.

In accordance with some embodiments of the disclosed technique, parameter values and other operating condition data are passed from the control modules 50, 52 and 54 to a data collection function 58 of a model identification routine or module 60. Generally speaking, the parameter values and other operating condition data are made available (or otherwise communicated) during execution of the control modules 50, 52 and 54 and function blocks thereof. Because such execution is rather continuous during the scheduled process control activities, the communication of the parameter values and other operating condition data may also be continuous.

Like the function blocks, the data collection function 58 may, but need not, be implemented in object-oriented fashion as an object(s) (or object entity). Regardless of its structure, the data collection function 58 may include one or more routines defining the procedures to be implemented in the data collection, including any data handling procedures. The routines of the data collection function 58 may thus coordinate, support or implement the storage of the collected data in, for instance, one or more registers 62 or other memories. The procedures executed by the data collection function 58 may include determining when to collect the data from the control modules 50, 52 and 54, as described below.

More generally, the data collection function 58 may include one or more routines to support the automatic collection, gathering, receipt or other handling of the parameters and other operating condition data. To the extent that the automatic collection or other handling of the parameters and data is implemented by the data collection function 58, less computational requirements are placed on the module 56, the control modules 50, 52 and 54, and any control blocks thereof. As a result of such separation of the model identification procedure from the control function blocks, the function block memory and execution requirements will be the same whether model identification is enabled or disabled. Furthermore, the number of parameters and associated memory requirements added to the control blocks to support adaptation (i.e., adaptive control) is minimized.

The separation of the modules 56 and 60 also allows some embodiments to provide an option to disable the model identification module 60 and, thus, the data collection function 58. Disabling model identification may be useful if, for instance, it is determined that the controller 11 has insufficient memory or time for the calculations and other processing. On a related note, the use of the identified models to provide adaptive control may be also be enabled or disabled on a loop, area, system or controller basis.

Separate model identification functionality also supports the coordination of process input changes. Such coordination is made possible because model identification within the controller is centralized in one process. For example, when no set point changes are being made, the model identification module 60 (or other element or routine) may automatically inject changes in the controller output. These changes may be coordinated in a manner to minimize the impact on process operation. These changes may thus be distributed over time.

Separate model identification also means that the processing of data for model identification may be performed in free or down time for the controller 11, or at any other time deemed suitable by the controller 11. As a result, the implementation of model identification processing avoids adversely impacting scheduled control functionality provided by, for instance, the module 56. As a result, in some embodiments, the model identification module 60 may be implemented by the controller 11 in the background, while the process is on-line, and at strategically advantageous times during the scheduled control and other activities undertaken by other modules or components of the controller 11.

In alternative embodiments, the model identification functionality may be integrated into the control function blocks themselves.

In some embodiments, the parameter and other data is passed from the control modules 50, 52 and 54 to the data collection function 58 automatically whenever a control block executes. In this sense, the data collection module 58 may be implemented continuously to support the data collection procedure at any time during operation of the process. During those times when control is not scheduled to execute, the data collection function 58 may then examine the collected data to determine if a process model should be generated (e.g., created or identified). In alternative embodiments, the controller 11 may examine or otherwise process the collected data periodically or in some other scheduled manner. Of course, in still other alternative embodiments, the data collection function 58 may not be implemented by, or as part of, the controller 11 to, for instance, minimize computational demands, or for any other desired reason. Further details regarding instances where such processing may not be embedded in the controller 11 are set forth below in connection with embodiments in which the disclosed technique is layered onto (or otherwise integrated with) a pre-existing process control system.

The data collected by the data collection function 58 may generally include values for the process inputs and outputs or the operating set point for a particular control loop implemented by the controller 11 (or, more generally, the process control system 10). For each of these parameters, values are collected and stored over a time period beginning before a trigger event and lasting until steady state is reached. In some cases, the trigger event may involve the detection by, for instance, the data collection function 58 of a change in the process input or set point.

In some cases, what constitutes a trigger event may depend on the operational mode of the control loop. When a control loop resides in an "automatic" mode of operation, the loop is continuously adjusting the controller output (i.e., the manipulated process input) to maintain a process output (i.e., the controlled parameter of the loop) at an operator-specified set point. Thus, in automatic mode, a change in the set point will constitute a trigger to analyze the change in process inputs and outputs and, thus, to develop a model. If the operator never (or rarely) changes the set point and the loop remains in automatic mode, then a small change may be injected in the controller output so that there is a trigger to create a model.

When the loop resides in a "manual" mode, then the controller output is set by the operator, i.e. the control algorithm is not adjusting the output. Thus, in manual mode, a change in the output introduced by the operator constitutes a trigger for analyzing process inputs and output to obtain a model.

The three above-described trigger events may be used for the development of feedback models. For feedforward model identification, the trigger event may be a change in the feedforward input value.

Once the trigger event is detected, the modules 56 and 58 communicate in any desired fashion to support the data collection. In some embodiments, the data collection is facilitated by the module 56, which may also indicate the detection of a trigger event. More specifically, the control loops implemented by the control modules 50, 52 and 54 may continuously provide access to the data or otherwise make the data available. As a result, data collected for some time before the trigger event may also be analyzed to determine the process model. For example, a PID control loop for which data is collected may provide access to the current data values for the process variable used in the block execution (e.g., PV), the block output value (e.g., OUT), the feedforward control input value (e.g., FF_VAL), the set point, and any one or more parameters that indicate the loop mode of operation. In some cases, the data collection function 58 may facilitate the selection of the parameter or other data values. Alternatively or in addition, the model identification module 60 may include a configuration list block(s) 64 that determines which parameters need to be collected. To that end, the configuration list block 64 may include a memory or other storage mechanism for the list data. Stored along with the identified parameters may be a list or other identification of the control blocks or modules for which the models are to be generated.

At some point following the data collection associated with a trigger event, the model identification module 60 may implement a model identification algorithm or calculation routine 66. The model calculation routine 66 may also analyze the calculated models in addition to merely performing the calculations. Such analysis may involve process and/or control diagnostics to determine, among other things, the quality of the model. The calculated models may then be passed along to a storage or other block 68 that holds the last identified model(s) for each control loop. In some cases, a control loop may have two models stored to support, for instance, both feedback and feedforward control. As shown in FIG. 2, the calculated models are passed to the block 68 after and depending on the quality of the model as determined by the model diagnostics of the routine 66.

The quality of the model may also be determinative of whether the model is passed along to the control function blocks of the control modules 50, 52 and 54. In the exemplary embodiment of FIG. 2, each of the control modules 50, 52 and 54 incorporates at least one control loop having adaptive control and, accordingly, receives process models from the model identification routine 60 as shown. However, the models calculated and otherwise identified by the disclosed technique may be processed and provided based on the aforementioned model quality determined by the block 66 and, in some cases, on the operational state of the control function block receiving the new model.

Figure 3:
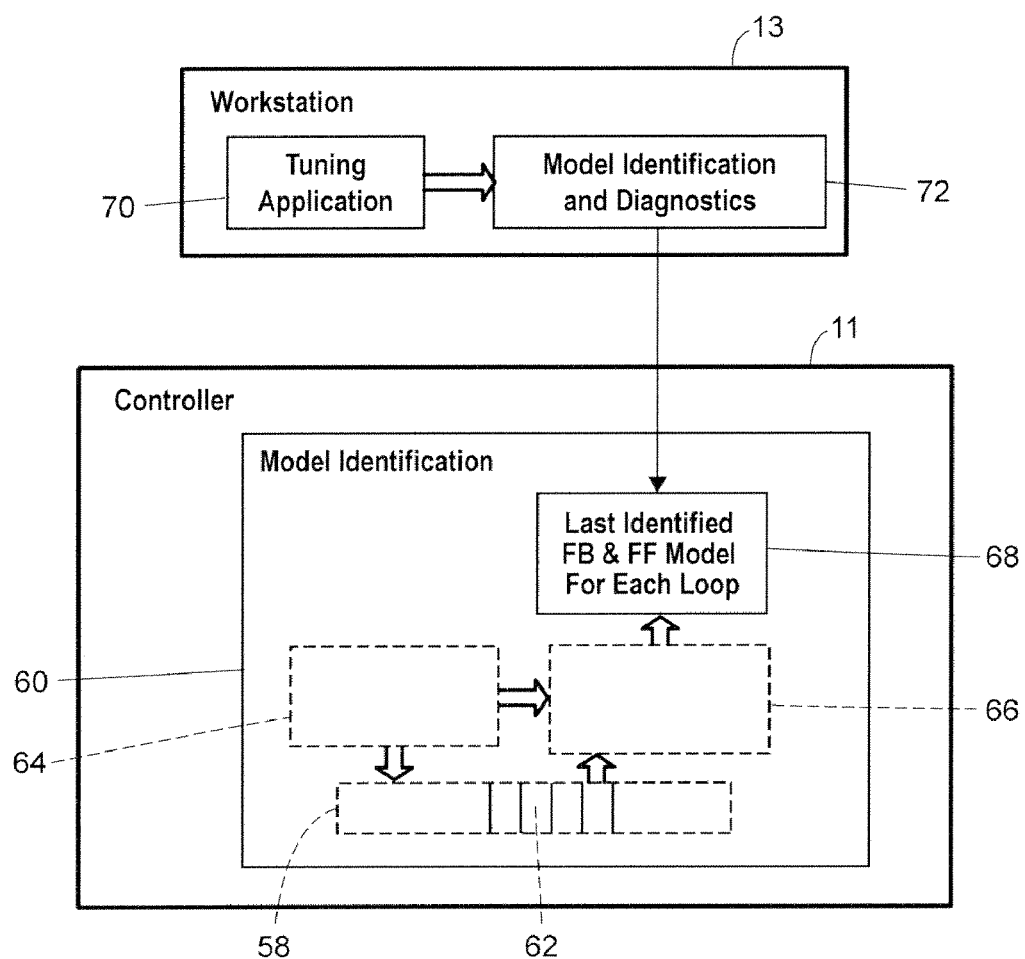
FIG. 3 is a schematic representation of the controller of FIG. 1 in accordance with an embodiment in which the controller is in communication with a workstation for model identification using trending or other historical data.

With reference now to FIG. 3, a user of one of the workstations 13 may initiate the creation of a process model by selecting real-time or historical data provided via a tuning or other application 70 implemented on the workstation 13. Such user-initiated process model creation may be in addition to the processing described in connection with FIG. 2. In fact, in the exemplary embodiment shown in FIG. 3, the controller 11 to which the model created by the tuning application 70 is passed also includes the model identification routine 60 and its constituent parts, i.e., the data collection function 58, the model calculation routine 66, etc.

Apart from the source of the parameter values and other operating condition data used to create the process model, the workstation 13 may implement the same or similar steps toward creation of the process model. For instance, the workstation 13 may include a model calculation and diagnostics module or block 72 similar to the block 66 of the controller 11. The model calculation block 72 may accordingly determine the quality and other aspects of the created block prior to, or in connection with, passing the block to the controller 11 and the storage block 68, as shown.

In some embodiments, the workstation 13 may have additional or alternative applications that provide similar functionality. In one case, the other application may provide one or more display interfaces that support the analysis and/or inspection of the process models identified via the disclosed techniques. Further information regarding this application is set forth herein below. In connection with the generation of the additional process models, however, these workstation applications may generate a trend window or display interface that provides an opportunity to select process data for use in the model creation. Using these trend windows or other interfaces, a user may select the data, including the time window. In these cases, the time to steady state may accordingly be determined via the time window selected by the user. Alternative embodiments may provide other mechanisms for manually or automatically selecting the time window.

Practice of the disclosed technique is not limited to a model identification routine located in either the controller 11 or the workstation 13 of the process control system 10. More generally, the model identification procedures described herein may be implemented in other devices or systems, either individually or in distributed fashion, and in varying degrees of cooperation and/or communication with the control loops from which the underlying parameters or data is collected. For instance, in some cases, the model identification procedures may be implemented in a remote manner, and/or by a system layered onto a process control system via an OPC or other interface.

As described above, practice of the disclosed technique is not limited to systems implementing adaptive control routines. However, the identification of process models via the disclosed techniques may be utilized to support such routines, when desired.

Figure 4:
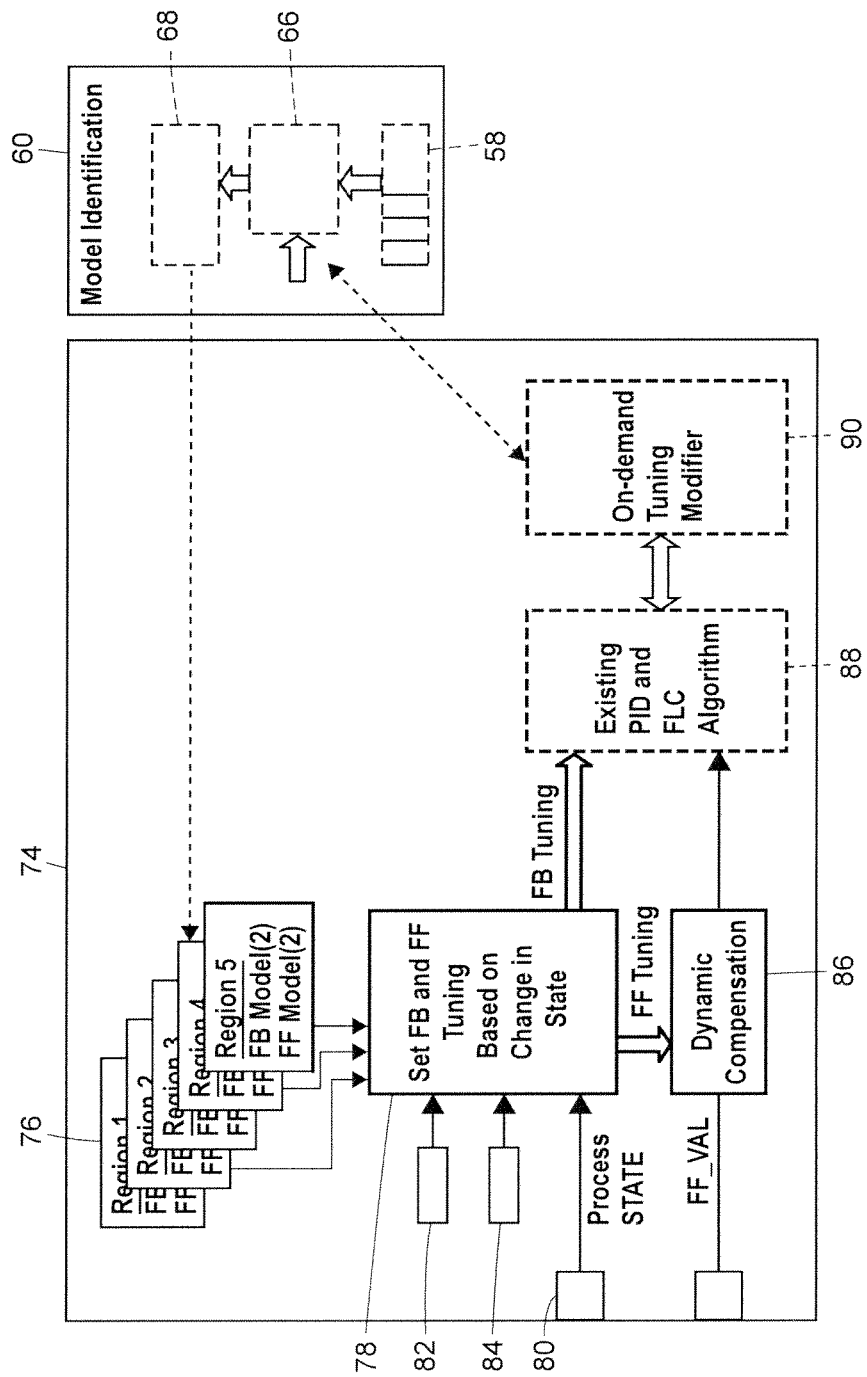
FIG. 4 is a schematic representation of an adaptive control function block of the controller of FIG. 1 in accordance with an embodiment in which the adaptive control function block modifies tuning in accordance with stored models and operational state information.

As shown in FIG. 4, an adaptive control function block 74 for use in connection with the disclosed technique may include one or memories or other storage mechanisms 76 to save or store a predetermined number (e.g., five) of process models that have been identified as described above. In operation, one of the process models stored in the memory 76 may then be selected for use via a logic block 78 responsive to one or more parameters. In the exemplary embodiment of FIG. 4, the block 78 selects the process model based on a selected or otherwise determined process state parameter provided via an input 80. Two other parameters 82 and 84 may also be relied upon for the determination, and may correspond with feedback and/or feedforward rules or a setting that allows the operational state to adapt to changing conditions.

The process models for the function block 74 may, but need not, be associated with operational regions (e.g., Region 1, Region 2, etc., as shown). The process models may also be identified in pairs in accordance with the control scheme of the function block. In this exemplary case, each region is determinative of a pair of process models in support of both feedback and feedforward processing. Upon selection of the region, the pair of feedback and feedforward models may be utilized by the block 78 to calculate feedback and feedforward tuning parameters, respectively. In the exemplary case shown in FIG. 4, the feedforward tuning parameters are provided to a dynamic compensation block 88 also responsive to a feedforward control input value (e.g., FF_VAL) for, e.g., dead time and lead/lag dynamic compensation. The results of the dynamic compensation, along with the feedback tuning parameters, may be passed to a block or routine 88 responsible for the implementation of the control algorithms for the function block. In this case, the feedback and feedforward parameters modify PID and fuzzy logic algorithms, but any control schemes, or control scheme combinations, may be utilized.

The function block 74 also includes a block or routine 90 to support on-demand modifications of the control loop tuning. To this end, the block 90 may be responsive to a user command entered via the controller 11, the workstation 13 or any other element of, or device in communication with, the process control system 10. In general, the model that has been automatically identified for the loop may, on demand, be used with a selected tuning rule to set the loop tuning. If a model has not previously been identified, then a user command may initiate a relay oscillation or other technique to inject changes in the controller output. The resulting process-model developed from the process response to the change in controller output may then be used with a selected tuning rule to set the loop tuning or to provide tuning recommendations.

In some cases, the process models generated via the block 90 or as a result of a triggering event (e.g., a set point or other parameter value change) may first be held for viewing before a download to the controller 11 or function block 74. For example, such models may be classified as "unapproved models" until analysis via a user interface has provided approval for implementation. In some embodiments, such approval may alternatively or additionally be provided automatically via diagnostic or other functionality in the controller 11 or workstation 13.

Figure 5:
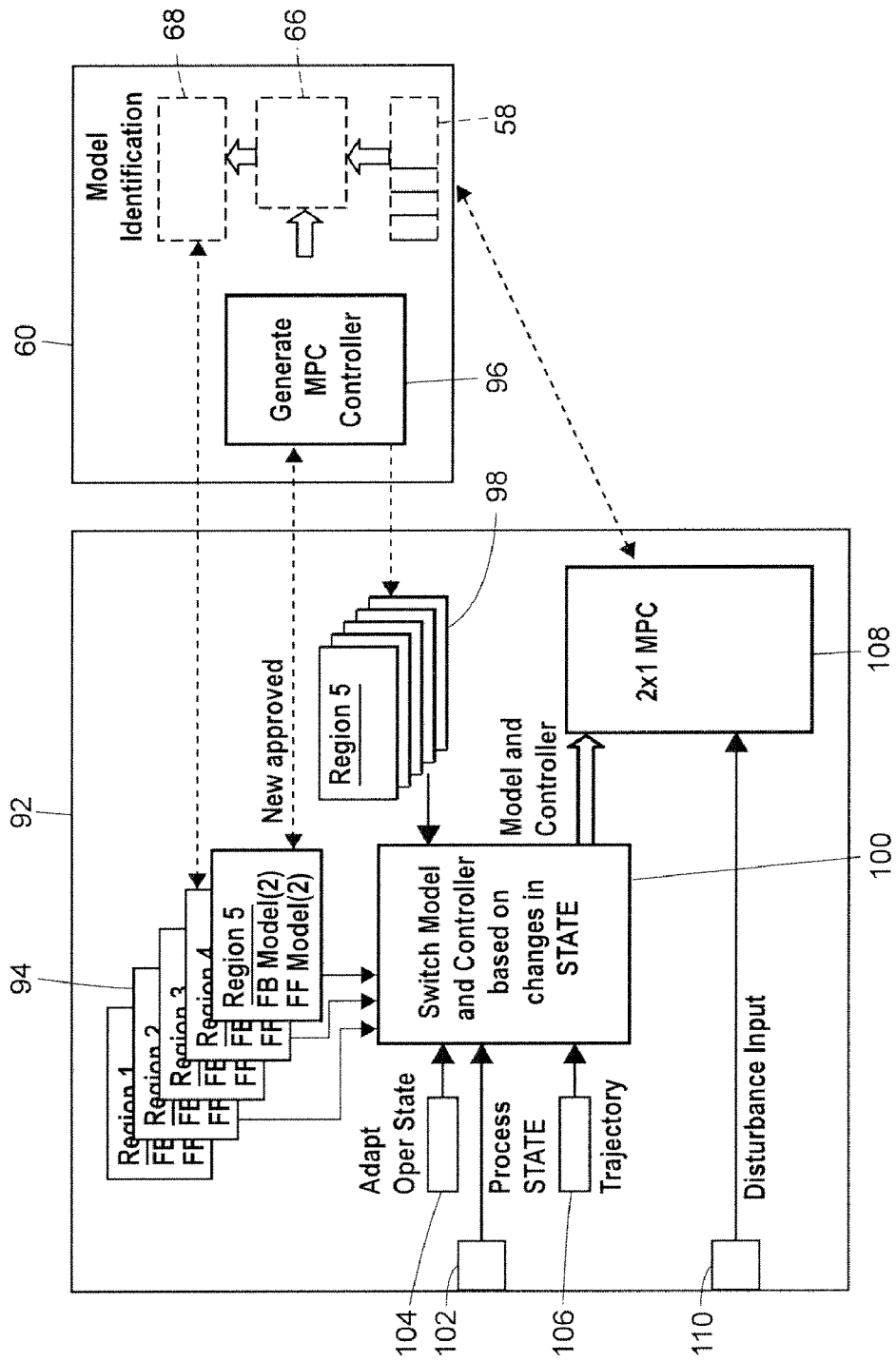
FIG. 5 is a schematic representation of an adaptive MPC function block of the controller of FIG. 1 in accordance with an embodiment in which the MPC function block implements on-demand testing for model identification.

FIG. 5 shows an adaptive block framework in the context of an adaptive MPC control block 92 in which a number of different operational regions are also supported. In this context, a plurality of process models identified via the model identification routine 60 may still be passed to a memory or storage 94 (similar to the memory 76 of FIG. 4) as shown, but the model parameters may be processed by an MPC controller generation routine 96 prior to implementation in the function block 92. More specifically, the routine 96 may generate a corresponding MPC controller for storage in a memory 98 based on the identified models. A logic block 100 may then select or switch between the models that are used to generate the MPC controller based on changes in a state parameter and other parameters provided via inputs or memories 102, 104 and 106, as shown.

The MPC controller associated with the selected process model may then be provided to an MPC controller block 108 for implementation in the on-line process. The MPC controller block 108 may support automated on-demand testing of the selected MPC controller, which may be initiated by the introduction of a disturbance input 110 or otherwise, as desired.

In some cases, the exemplary adaptive control function blocks shown in FIGS. 4 and 5 (as well as other blocks for use with the disclosed technique) generally support three modes of operation: a learn mode, a schedule mode and an adaptive mode. In the learn mode, process models may be collected but are not automatically used to determine the loop tuning. In the schedule mode, new process models may be collected and those models that are approved will be automatically used to determine loop tuning parameters. In the case of an adaptive MPC block, such approved and applied models will then be used in control generation in accordance with the current operating region; as the controllers will be automatically switching with the current operating region. In the adaptive mode, process models are collected, automatically approved and then automatically used to determine loop tuning parameters. While the default setting for each function block may be the learn mode, the display interfaces provided via, for instance, one of the applications implemented on the workstations 13 may provide an opportunity to change the setting, as desired.

Figure 6:
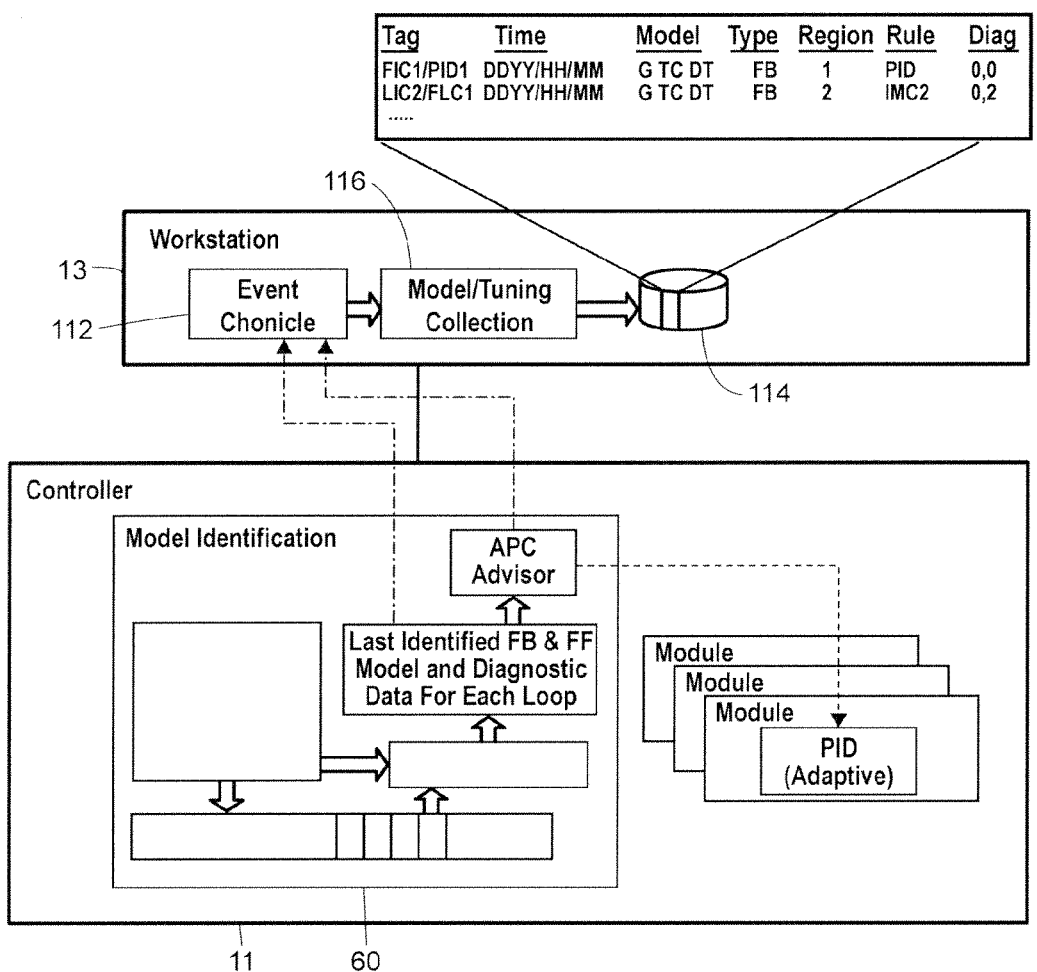
FIG. 6 is a schematic representation of the controller of FIG. 1 in accordance with an embodiment in which identified models are stored in a database in association with historical event information.

With reference now to FIG. 6, one or more applications implemented by the workstations 13 provide performance monitoring, analysis, management and related functionality for the control loops and process models identified via the disclosed techniques. For example, the performance monitoring functions may include the generation of a process model history in which data indicative of the identified process models is entered for subsequent use or analysis. Further details regarding the generation and use of a process model history are set forth below. At one level, the history data may specify the process model parameters (e.g., dead time, time constant and gain) that completely define each process model identified by the disclosed techniques. Armed with that historical data, a number of analyses may be conducted regarding the control loop, its tuning, the control scheme (e.g., adaptive or non-adaptive), etc.

In some embodiments, one aspect of the process model history is directed to the generation of an event chronicle for the identified process models. More specifically, whenever a process model is identified either automatically in the controller 11 (FIG. 2) or on-demand from real-time or historical data (FIG. 3), the model identification routine 60 may send an alert (or other message) to an event chronicle or tracking module 112. The event chronicle module 112 responds to the alert by generating data specifying the time and date of the model identification, along with any other data to facilitate the association of the model with the particular control loop, device, plant region, etc. In the exemplary embodiment shown in FIG. 6, data stored for each event includes a tag name for the device associated with the node or control loop, a date/time stamp, a model type (e.g., by identifying parameters such as dead time, time constant and gain), a control loop type (e.g., function block), a plant region number, a tuning rule, and a diagnosis indication for the control performance. The foregoing (or other) data may be stored as part of the process model history in a database 114 after processing by an application 116 that may, for instance, add one or more elements to the data set. The application 116 may correspond with one or more routines directed to monitoring and/or managing the tuning of each control loop.

The database 114 may store such historical data for control loops that reside in multiple controllers 11 within the system 10 and need not be limited to use with any one particular type of controller. For instance, the database 114 may store such data for third-party controllers.

Figure 7:
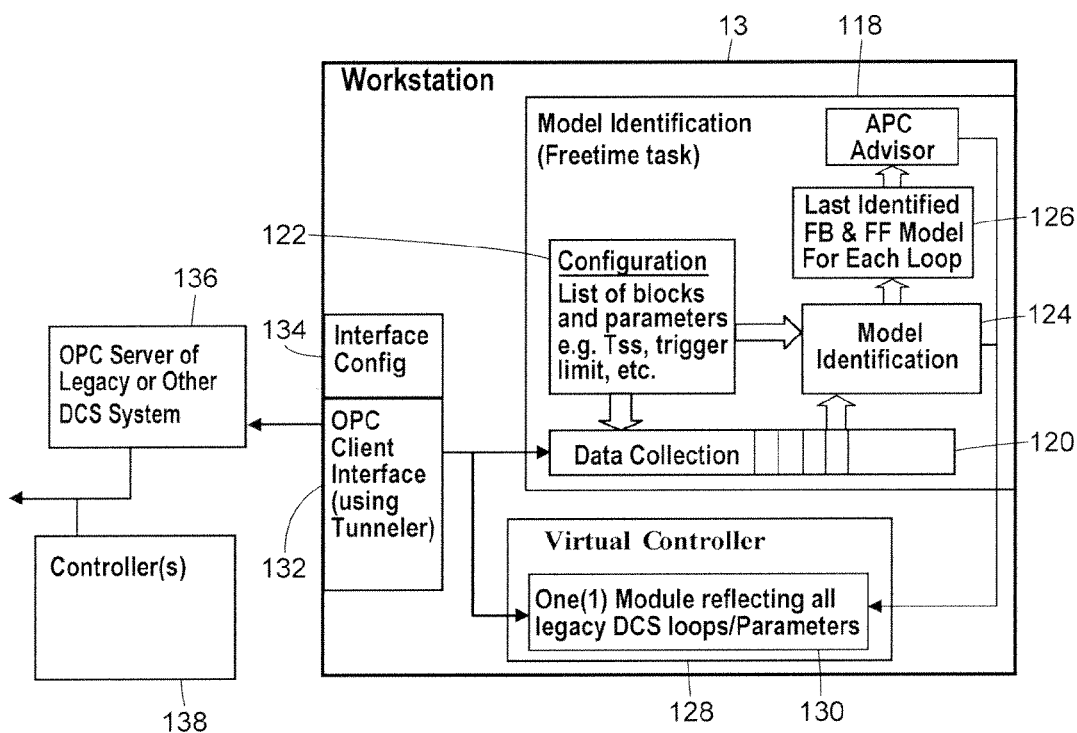
FIG. 7 is a schematic representation of an alternative embodiment of the process control system of FIG. 1 in which a workstation implements a model identification routine in communication with a controller via an OPC or other interface.

More generally, and as shown in the exemplary embodiment of FIG. 7, implementation of the disclosed system, method and techniques may be applied to legacy or third-party process control systems. In other words, the disclosed systems and techniques may be implemented "on top of" the legacy or other process control systems.

In these cases (and other alternative embodiments), the workstation 13 generally includes the above-described model identification functionality otherwise implemented in the controller 11. For example, the workstation 13 may include a model identification module 118 having a data collection function 120, a configuration list module 122, a model calculation routine 124, and a memory 126 for storing the last identified model(s) for each control loop. In addition to those elements that correspond with the elements of the model identification module 60 of the above-described controller 11, the workstation 13 may also maintain a virtual controller 128 for the control system for which the process models are being identified. The virtual controller 128 may include and store, for instance, modules reflecting the current configuration of each control loop along with an identification of the respective parameters thereof. That is, the model and diagnostic information generated via the disclosed techniques are saved in a module automatically created for that node. In this way, the virtual controller 128 may be utilized to present information via tuning, diagnostics, etc. in exactly the same manner as would be done in connection with loops implemented in the controller 11. In the event that the naming conventions of the control system differ from those of the workstation 13, definitions correlating the parameters may be made via the interface configuration block 134 or other element of the workstation 13.

To support the broad application of the disclosed techniques, the workstation 13 may include an OPC (Open Process Control) or other client interface 132 configured via a block 134 to access loop dynamic parameters. Generally speaking, the communication link between the workstation 13 and the legacy or third-party control system may be established by identifying an OPC server 136 thereof and, in some cases, other communication settings, such as an identification of one or more controller(s) 138 involved in the model identification process. To avoid opening many (e.g., unnecessary) communication ports, such OPC connections may be made using tunneler software.

Further details regarding the applications provided via the workstation 13 (in either a legacy or standard, integrated context) to control and manage implementation of the disclosed technique are now provided. The applications generally support the identification of process models, as described above, and also provide the functionality associated with the use of the identified models. As described above, the process models need not be generated merely for use in connection with an adaptive control scheme. The identification of process models in accordance with the disclosed technique is implemented regardless of whether the control routine is an adaptive control routine. Identifying process models for all of the control loops—both adaptive and non-adaptive—generally provides the capability to perform a number of different analyses of the process, the process control system, and specific elements thereof. That said, in some cases, the disclosed system may provide an option via a dialog box, window, faceplate, or other display interface to disable model identification on a node-by-node (or loop-by-loop) basis. The display interface may be one of a number of display interfaces generated via the implementation of the applications running on the workstations 13. Examples of such display interfaces are provided in FIGS. 9-16.

Referring again to FIG. 1, as a general matter, the workstations 13 include (either individually, distributed or any other fashion) a suite of operator interface applications and other data structures 140 which may be accessed by any authorized user (e.g., a configuration engineer, operator, etc.) to view and provide functionality with respect to devices, units, etc. connected within the process plant 10. The suite of operator interface applications 140 is stored in a memory 142 of the workstation 13 and each of the applications or entities within the suite of applications 140 is adapted to be executed on a respective processor(s) 144 associated with each workstation 13. While the entire suite of applications 140 is illustrated as being stored in the workstation 13, some of these applications or other entities may be stored and executed in other workstations or computer devices within or associated or in communication with the system 10. Furthermore, the suite of applications 140 may provide display outputs to a display screen 146 associated with the workstation 13 or any other desired display screen or display device, including hand-held devices, laptops, other workstations, printers, etc. Likewise, the applications within the suite of applications 140 may be broken up and executed on two or more computers or machines and may be configured to operate in conjunction with one another.

Figure 8:
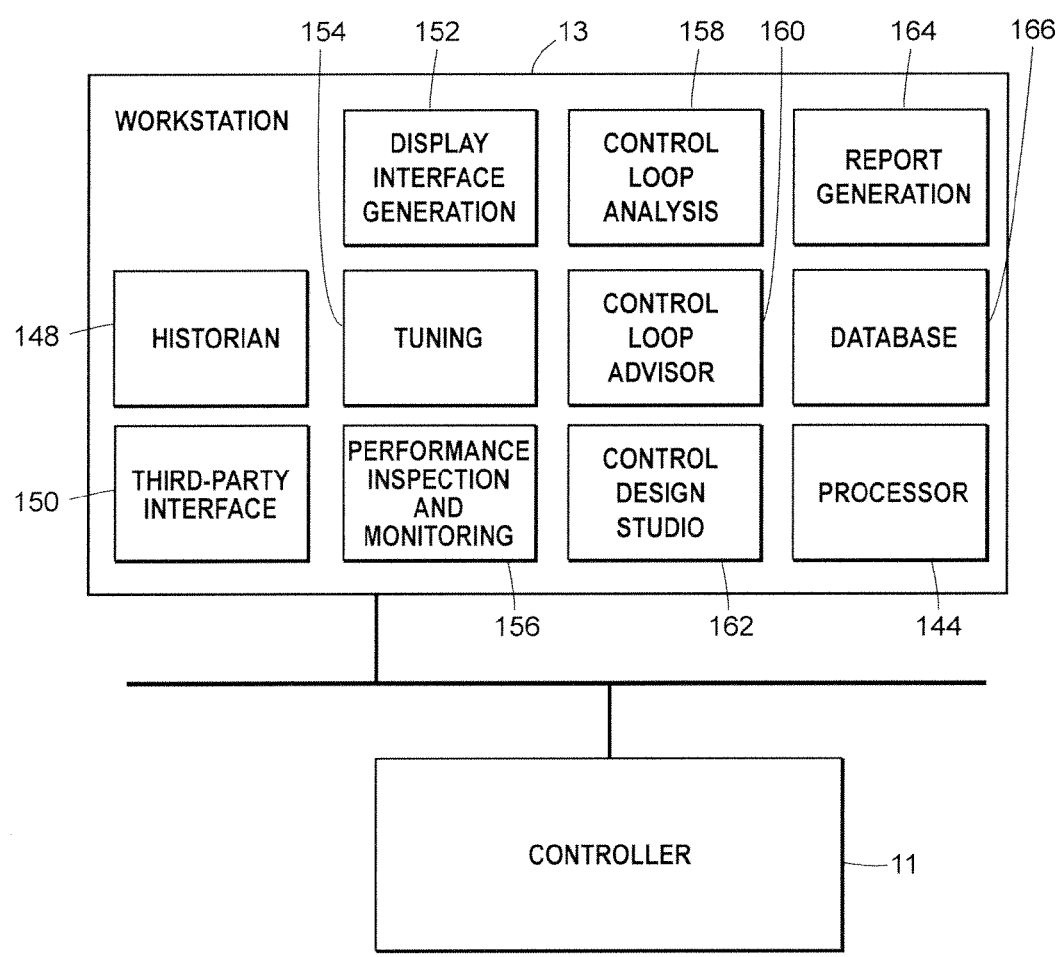
FIG. 8 is a schematic representation of one embodiment of the process control system of FIG. 1 in which a workstation implements an exemplary suite of applications that together provide a control performance monitoring and management environment with associated functionality for, inter alia, loop and model analysis, diagnostics, tuning and MPC and adaptive control.

FIG. 8 shows an exemplary workstation 13 in greater detail in connection with the implementation of the disclosed system, method and model identification techniques. Specifically, the suite of applications 140 may include a number of applications, routines, modules, and other procedural elements directed to the implementation of model-based monitoring and management of the control system 10, as described herein. The applications, routines, modules and elements may be implemented via any combination of software, firmware and hardware and are not limited to the exemplary arrangement shown in FIG. 8. For instance, one or more applications may be integrated to any desired extent.

The application suite may include a historian application 148 dedicated to supporting the recordation of process model data (e.g., parameters) as the models are identified via the above-described techniques. To this end, the historian application 148 may communicate with the historian database 12 or any other memory or storage mechanism. As described above, the process model data may be stored in connection or association with data chronicling the identification of the process model (or the collection of the data leading thereto). The historian application 148 may also provide analytical functionality such as the calculation of totals, averages and other values for selected model parameters. The historian application 148 may facilitate the viewing of such calculated values, as well as the underlying stored data, via one or more display interfaces.

A third-party interface application 150 may be provided to support and maintain a communication link with a third-party or legacy process control system, as described in connection with FIG. 7. To that end, the application 150 may generate a number of display interfaces to facilitate the configuration of the communication link, maintain and utilize the virtual controller 128, and otherwise support the interface.

Further display interfaces may be provided by an application 152 directed to supporting communications with the controller 11. Such communications may involve or include the configuration and maintenance of adaptive control routines executing in the controller 11. As is the case throughout the application suite, the display interfaces may take any form, including without limitation dynamos, faceplates, detailed displays, dialog boxes, and windows, and may be configured for display on different display types.

The application suite may include an application 154 dedicated to use of the process model information in connection with tuning. As a result of the above-described model identification techniques, the tuning application 154 is directed to improving process control performance by calculating tuning parameters automatically from normal day-to-day changes in the plant, or from on-demand tuning tests. The tuning results may be used for both "open-loop" tuning recommendations, and for "closed-loop" adaptive control.

More specifically, the tuning application 154 may generate a number of display interfaces to support the performance of continuous tuning calculations for all control loops in either open loop or closed loop operation. The tuning calculations support both standard and adaptive control, on PID, fuzzy logic, and MPC controllers and, thus, provide tuning recommendations for both feedback and feedforward control. The tuning application 154 may also provide on-demand tuning, as described above, using either a relay oscillation or other procedure.

The tuning application 154 has access to the process model history data stored in the historian database 12 (or elsewhere, as desired) and, thus, may calculate optimal tuning using historical process model data. To that end, the display interfaces may provide or include tools to easily peruse the history to locate and select data suitable for such tuning calculations. This aspect of the display interface(s) generated by the tuning application 154 generally allows a user to change model parameters (e.g., time to steady state, event trigger threshold) and re-identify models, or identify models for loops that were not previously enabled for automatic model identification.

The tuning application may also provide an interface to support analysis of a history of tuning calculation results. This capability may facilitate the analysis of adaptive control opportunities and the improvement of adaptive control configurations.

As described above, the tuning application 154 may provide an interface to support the introduction of control "perturbations" that help identify controller tuning when there are few manual changes to the process (i.e., automatic injection on controller output). An option may be provided via the interface to disable perturbations once good tuning is calculated. If multiple control loops are being perturbed, the moves may be synchronized to distribute and minimize the process disturbance.

The tuning application 154 may be responsive to process states and other status indications, such that any calculation results are identified accordingly. In this way, the disclosed system avoids the use of information calculated in the wrong state or with bad process data. To that end, model-related calculations may indicate whether the results are good, bad or not available, with explanations where appropriate.

The tuning application 154 may also generate summary reports to convey, among other things, tuning recommendation information and a user log that documents tuning changes and any adaptive control tuning analysis.

Further details regarding the display interfaces generated by the tuning application 154 (either alone or in conjunction with other applications) are presented in connection with FIGS. 12-16, which generally depict the views of the process models and control loops provided to a user to facilitate the above-described functionality.

With continued reference to FIG. 8, an application 156 is generally directed to automatic control performance monitoring utilizing the process models identified via the disclosed techniques. The application 156 is more specifically directed to improving process control performance by facilitating or automatically implementing (i) the identification of opportunities for control improvement, (ii) the analysis and diagnosis of the source of control problems, and (iii) the generation of meaningful performance reports for operations, control and maintenance personnel. To this end, the application 156 may generate a control performance index based on the process models. This "model-based" index provides a better benchmark to identify control loops that need re-tuning. The new index measures the opportunity for improving control based on factors such as process variability, the identified process model, and existing controller tuning. Such performance monitoring may, if applicable, take into consideration unit states and exclude performance calculations when the loop is in an inappropriate unit state, or when other status indications (e.g., Fieldbus status) or I/O communications are bad. Valve stiction, backlash and other valve diagnostic indices may also be provided for all valves.

The foregoing features and those described below are generally provided via a comparison of control performance done by utilizing the process models that are automatically created via the disclosed techniques. Through the use of the process models, poorly tuned control loops and changes in the process that impact control performance may be identified. Deviations in the process model from the historic values may be used to flag the control loop as a potential process problem.

Again, using the process models, an oscillation index may also be generated by the application 156 to identify loops that are oscillating. More specifically, an oscillation analysis tool may identify other loops that have the same oscillation period and may be interacting with the primary loop. This information may then be used to identify process interactions and possible design recommendations.

Diagnostic information provided by the application 156 may be accompanied by an indication of the expected cause of poor control performance. For example, diagnostics may indicate whether poor control performance is caused by instrumentation errors, valve stiction or backlash, process interactions, or controller tuning.

Generally speaking, the control performance monitoring information may be provided in any desired form, including a number of customized display interfaces and reports. Historical performance reporting may be provided to display how a control loop has performed over a user-specified period of time. Default time periods for such reporting include last hour, last shift (8 hours), last day, last week, last month. The user may be provided an option to "drill down" from summary reports to access detailed loop information. The reports or interfaces may be customized for management summaries with, for instance, an overall weighted performance index for plant-wide and individual process units, trends and/or tables comparing the current period with prior periods, and lists of top priority loops with a corresponding performance measure. Maintenance reports may present control loop performance indices and prioritize work items based on their-relevant importance to plant operations. Other reports may provide statistics including data for the control performance index, standard deviation, oscillation index, process model (if available), auto and cross correlation, histogram, power spectrum, etc.

Further details regarding the information provided by the application 156 are provided via the exemplary display interfaces depicted in FIGS. 9-12.

The application suite may also include a separate control loop analysis application 158. In some embodiments, the application 158 is made available via the display interface(s) generated by the application 156. In any event, the application 158 supports analysis 6/historian or real-time data collected in connection with the above-described model identification techniques. The data may be presented via an interface that facilitates the examination of variation in control from unmeasured disturbances and measurement noise. For example, the problems identified via the applications 154 and 156 may be further examined using the analysis application 158 for diagnosis. To that end, the display interface generated thereby may provide options for calculating power spectrum, autocorrelation and histogram data.

An advisor application 160 may generally provide functionality that utilizes the identified models in connection with diagnostics to detect abnormal conditions or opportunities to improve the control scheme through tuning or algorithm modifications. The information provided by the advisor application 160 may be provided in any type of display interface, including a faceplate generated via the workstation 13, the controller 11 or any other element in communication with the system 10. In one specific example, the display interface may have a flag for indicating the display of a new advisory message, such as "Check Tuning."

More generally, the advisor application 160 may provide recommendations generated as a result of analysis or diagnostics performed by any one of the applications in the suite. Furthermore, the recommendations need not be provided by a display interface generated by the advisor application, but rather may be sent for display to any one or more of the applications in the suite. Thus, recommendations and messages such as "New Tuning Available," "Examine Process—significant change in process has been detected," "Check Valve—dead band/hysteresis large," "Check Tuning—loop unstable," and "Control could be improved using MPC/Adapt" may be generally provided via the workstations 13 or other devices in communication with the process control system 10. In addition to the display of the message or recommendation, details regarding the underlying condition may be stored as a history or other parameter for the control loop. Subsequent access or use of the data stored for the control loop may then cause the details or associated message to be displayed for a user of the advisory or other application in the suite.

Other applications that also support the implementation of the disclosed techniques include a control studio application 162 to facilitate navigation within the process control system 10 and a report generation application 164 for the generation of the aforementioned reports. Lastly, one or more memories or databases 166 may also be provided as part of the application suite.

Figure 9:
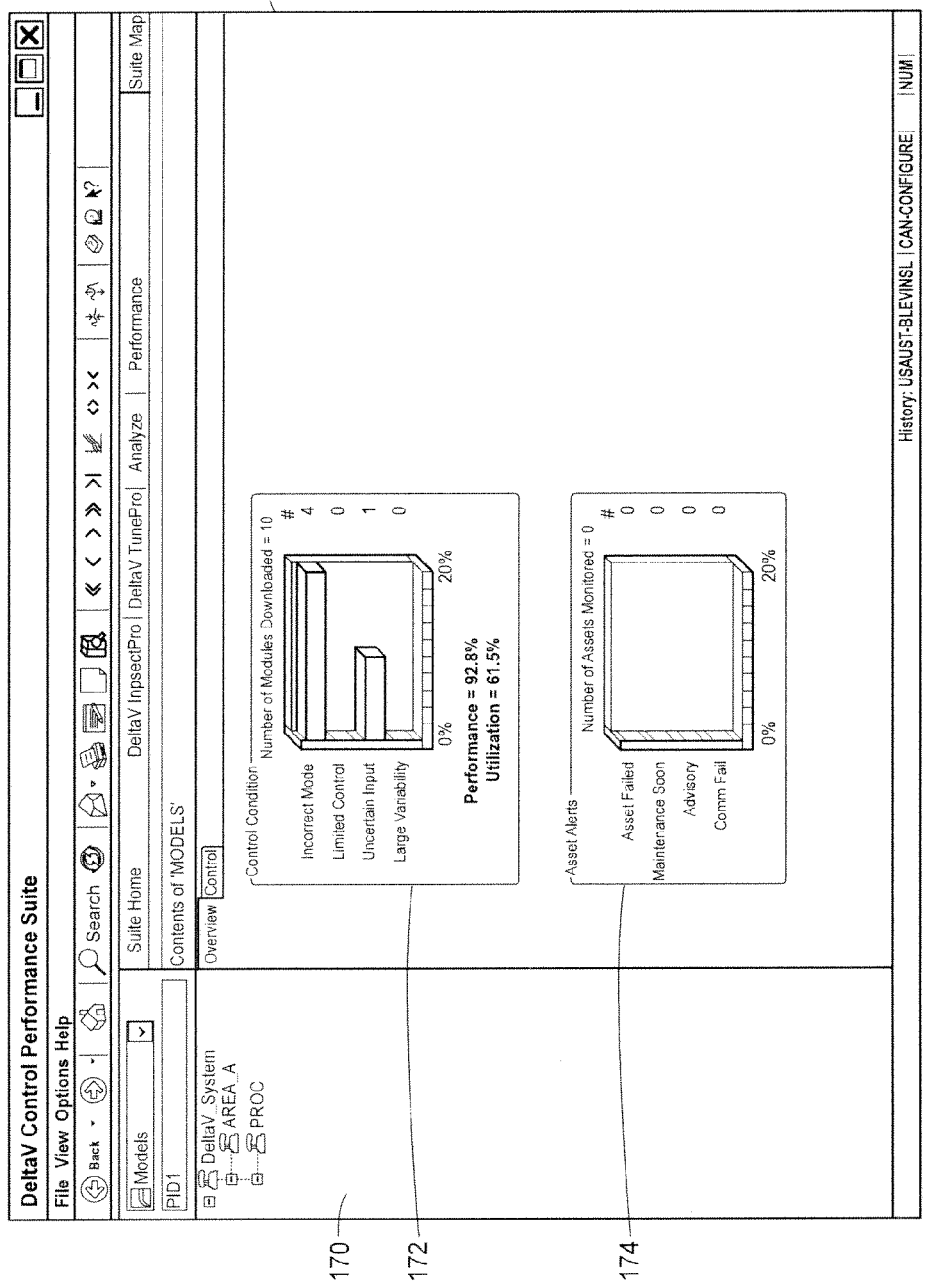
FIG. 9 is a simplified representation of an exemplary display interface generated by an embodiment of the workstation of FIG. 8 having a performance monitoring application to provide control performance overview information.

FIG. 9 depicts an exemplary display interface 168 that may be generated by the performance monitoring application 156 (or, alternatively, any one or more of the other applications) to present overview information resulting from the process model inspection analysis. In this specific example, the display interface 168 presents information indicative of the condition of the control routines or modules in the entire process control system 10, or any area thereof selected via a hierarchy-tree panel 170. The control performance may be specified and summarizes in a chart panel 172 via categories, including "Incorrect Mode," "Limited Control," Uncertain Input," and "Large Variability." The assignment or classification of a control module, function block or routine into one of these categories is generally enabled by, and may be automatically implemented using, the process models identified via the disclosed techniques. The display interface 168 also includes an asset alert chart panel 174 to present statistical information on the numbers of assets deemed to be failed, requiring maintenance soon, having an advisory alert, or experiencing a communication failure.

Figure 10:
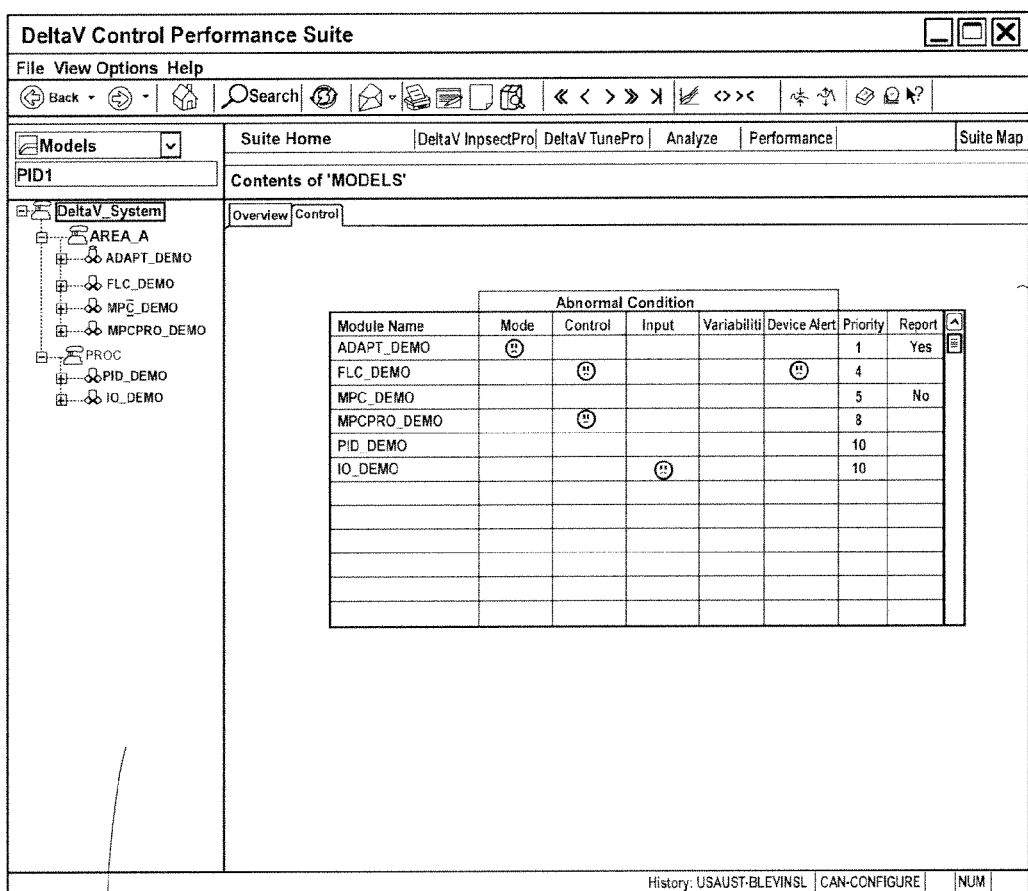
FIG. 10 is a simplified representation of an exemplary display interface generated by an embodiment of the workstation of FIG. 8 having a performance monitoring application to provide control loop performance information for a selected system, area or other group of control loops.

FIG. 10 depicts an exemplary display interface 176 that may also be generated by the performance monitoring application 156. The display interface 176 also generally presents control performance information, but on a more detailed level. In this example, performance information is presented for each control loop or module in an area selected in the hierarchy-tree panel. Each abnormal condition detected for a particular control loop may be noted in a table distinguishing between problems associated with an abnormal mode, limited control, input status, high variability or an inactive, related device. A priority level may also be displayed, along with an indication as to whether a report has been generated describing the abnormal condition.

Figure 11:
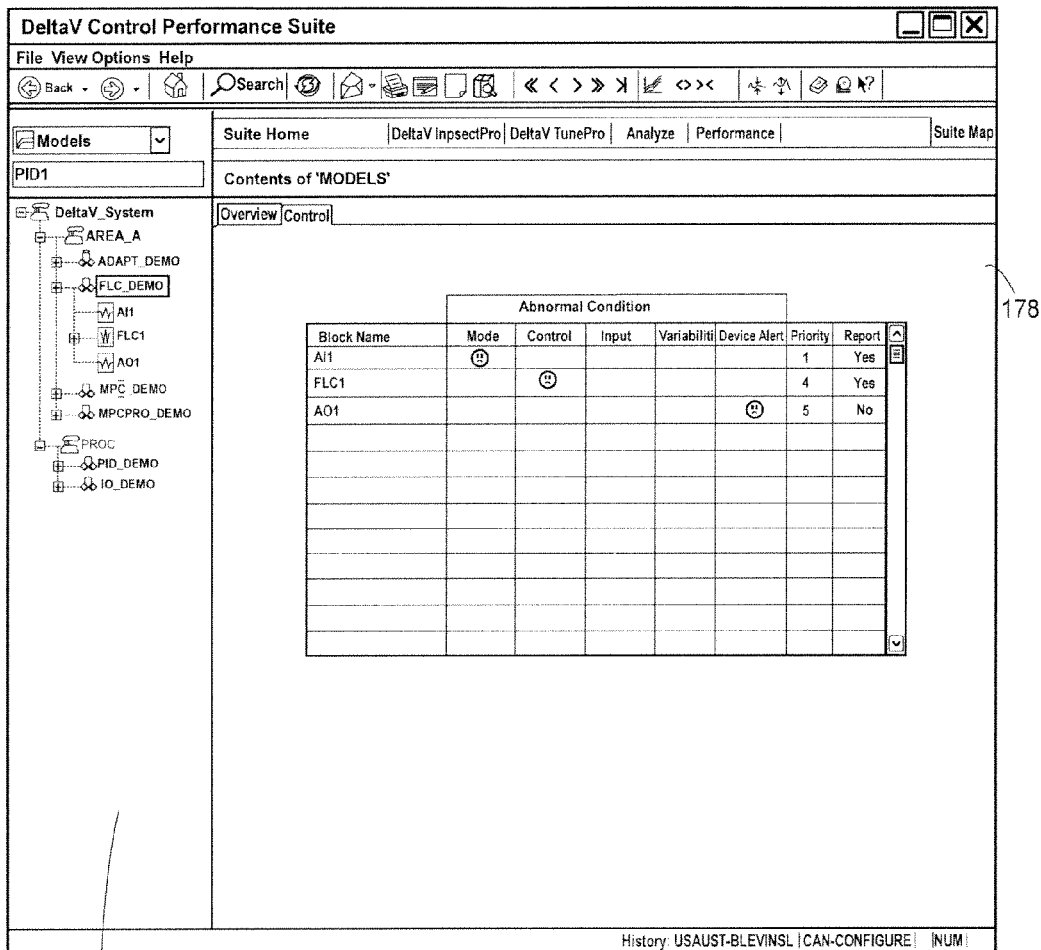
FIG. 11 is a simplified representation of an exemplary display interface generated by an embodiment of the workstation of FIG. 8 having a performance monitoring application to provide performance information for a selected control loop.

FIG. 11 depicts an exemplary display interface 178 that may also be generated by the performance monitoring application 156. The display interface 178 is similar to the interface 176 of FIG. 10, and differs in the control level at which the performance information is presented. In this case, a module or loop is selected via the panel 170, and the performance information is presented for each function block thereof. Diagnostic information for a particular block may then be accessed by selecting (e.g., right-clicking) on the block name displayed in the table.

Figure 12:
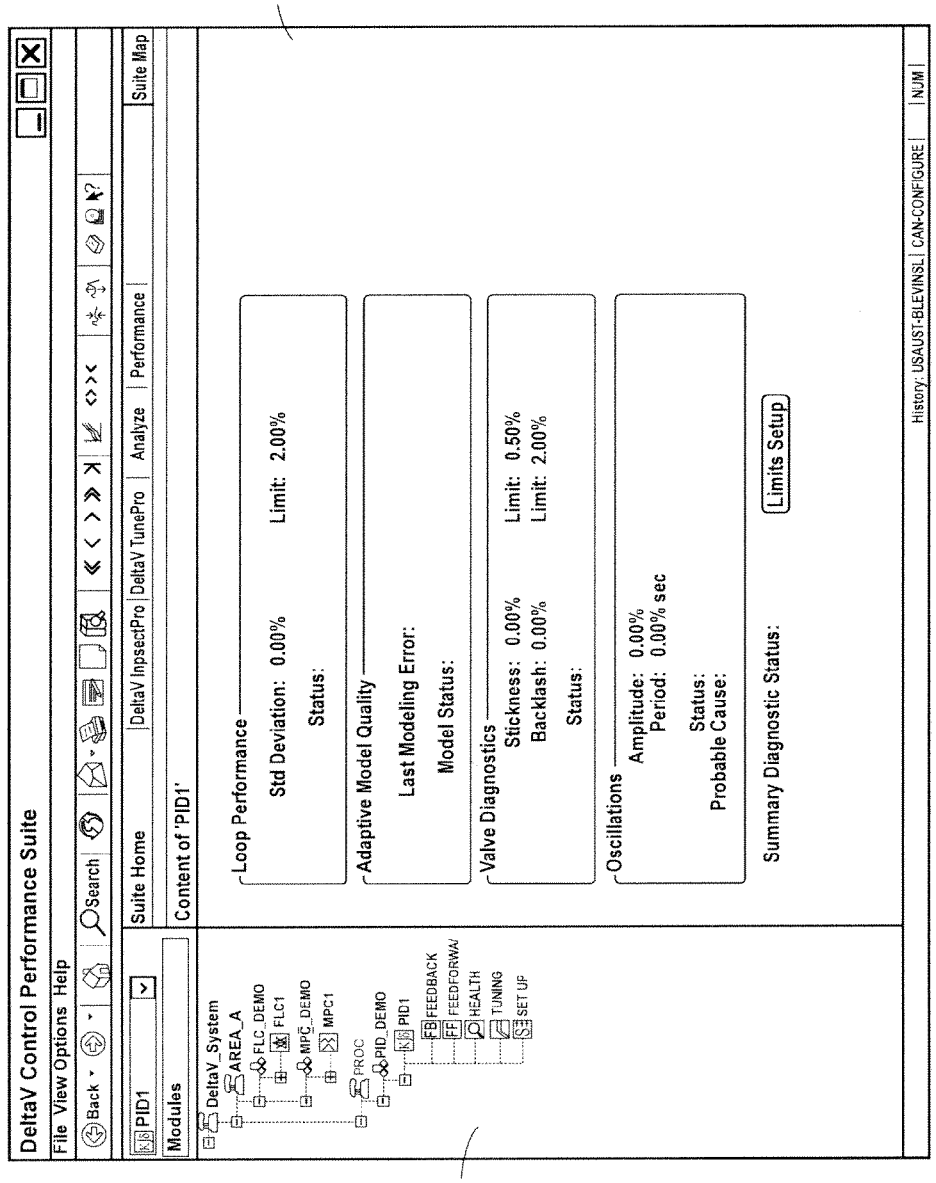
FIG. 12 is a simplified representation of an exemplary display interface generated by an embodiment of the workstation of FIG. 8 having a diagnostics or other analysis application to monitor and manage control loop performance, adaptive model quality, and other diagnostic parameters related to a control loop.

FIG. 12 depicts an exemplary display interface 180 that may be generated by one or more of the applications, including the tuning application 154 and the performance monitoring application 156. Generally speaking, the display interface 180 facilitates the examination of results of diagnostic calculations for a selected control element (e.g., PID1). Limit values for the statistics derived via the calculations are also displayed for comparison and user-modification, as desired. When a limit is exceeded, an alarm may indicate the associated condition. More generally, the information presented in the display interface 180 and the underlying calculations are indicative of how the stability of the control loop is continuously monitored as a result of the process model identification techniques disclosed herein.

Figure 13:
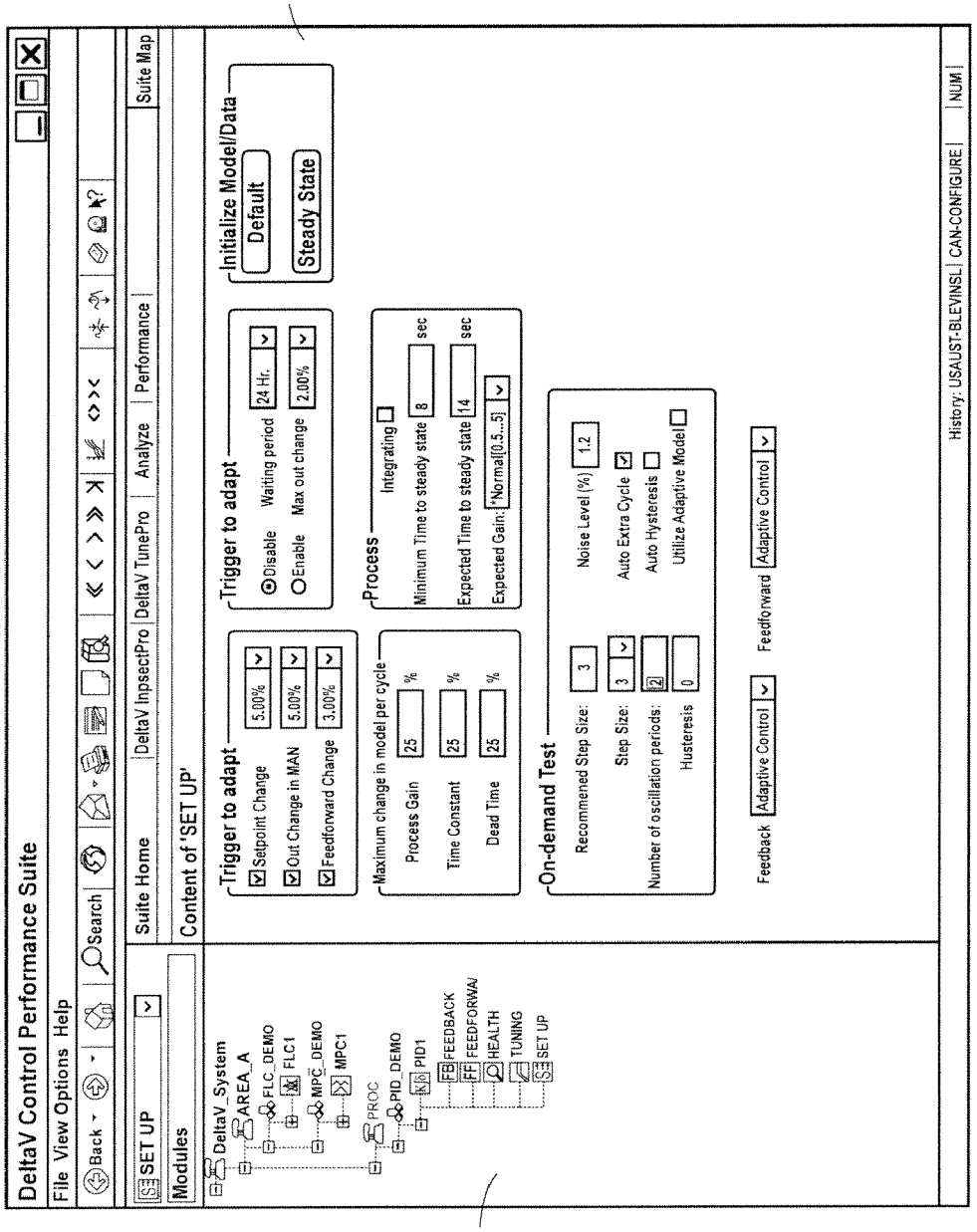
FIG. 13 is a simplified representation of an exemplary display interface generated by an embodiment of the workstation of FIG. 8 having an application to configure, customize and manage the model identification procedure for a control loop.

FIG. 13 depicts an exemplary display interface 182 that facilitates the setup of a control loop for automatic process model identification as well as on-demand model identification. A number of panels are provided via the interface 182 to specify trigger event types, trigger event levels, parameter change maximums, etc. In this way, the display interface 182 enables a user to customize the process model identification procedure on a node-by-node, or loop-by-loop basis.

Figure 14:
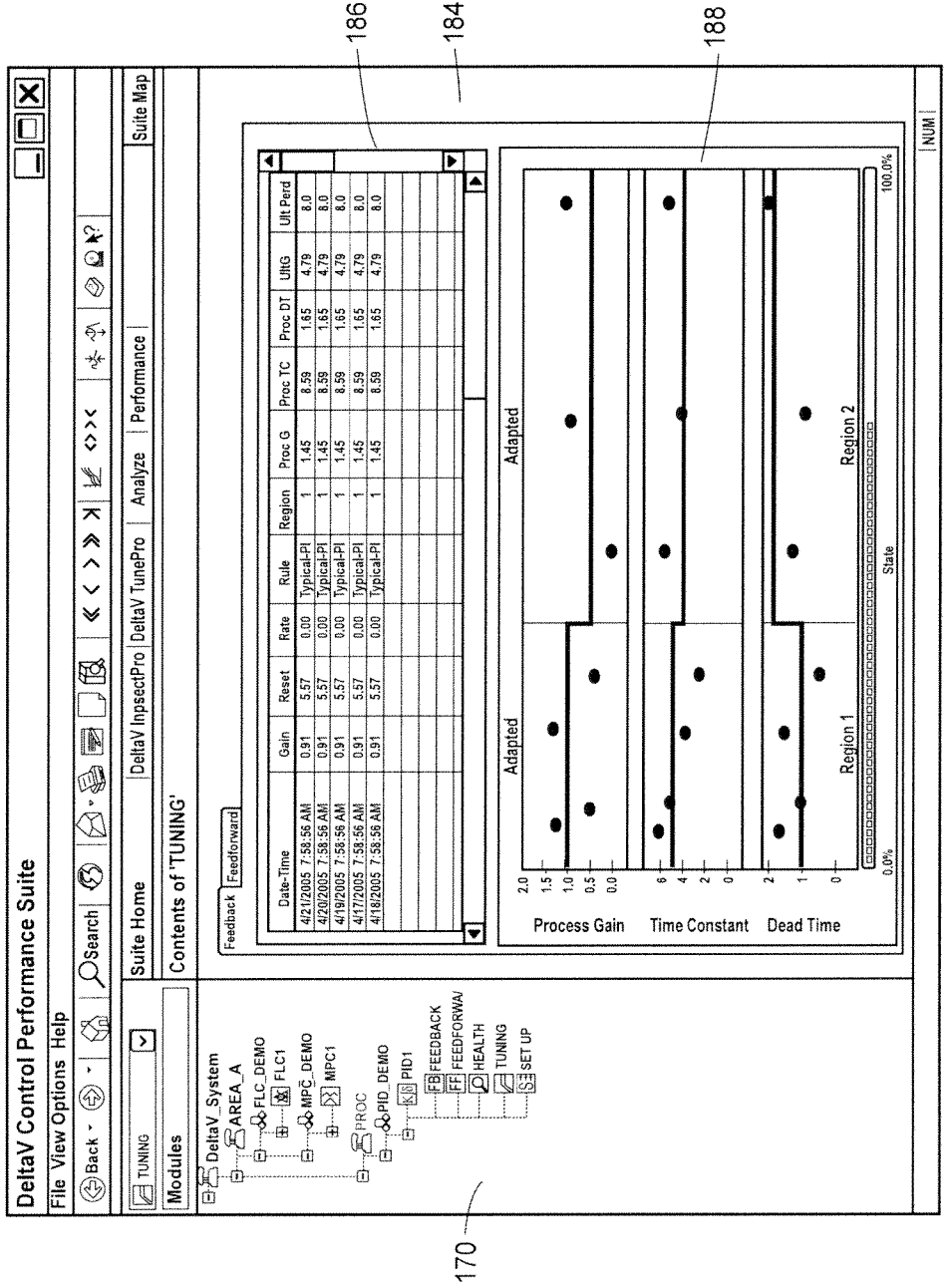
FIG. 14 is a simplified representation of an exemplary display interface generated by an embodiment of the workstation of FIG. 8 to visualize process models identified for different operating conditions indicated by a state parameter input; and, FIGS. 15 and 16 are simplified representations of respective exemplary display interfaces generated by an embodiment of the workstation of FIG. 8 having a tuning application to support and manage the use of process models to tune control function blocks implementing, for instance, fuzzy logic or MPC control schemes.

FIG. 14 generally depicts the way in which a user may visualize the saved process models to, among other things, determine how many regions are required. More specifically, a display interface 184 includes a panel 186 listing process model history information and a model graph panel 188 that shows, via respective horizontal lines, the approved model values and, via the dots, the parameters of process models identified and stored in the history database. As described above, respective models may be approved for a number of regions (e.g., five), and the variance of the model parameters may facilitate the identification of the regions and otherwise help with tuning recommendations.

Figure 15:
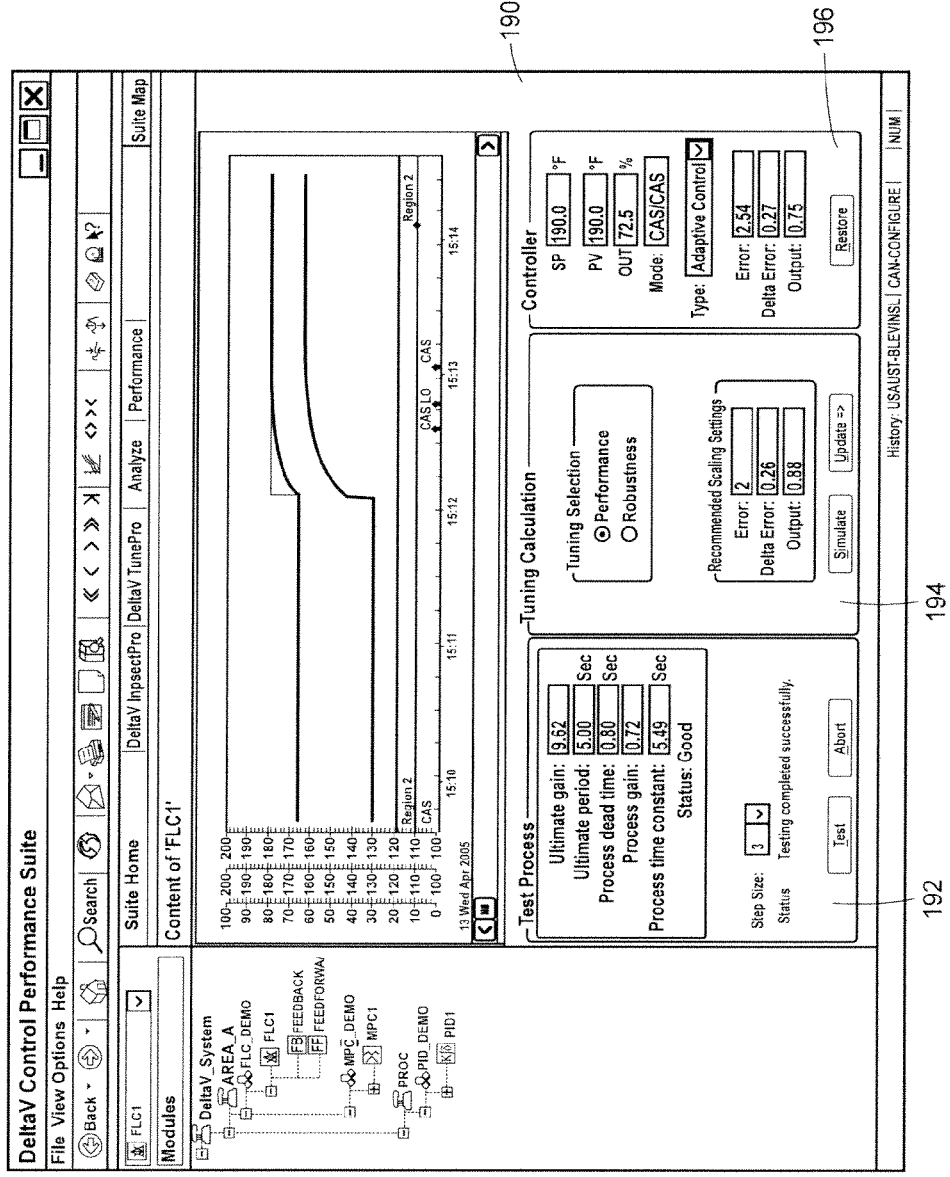
Figure 16:
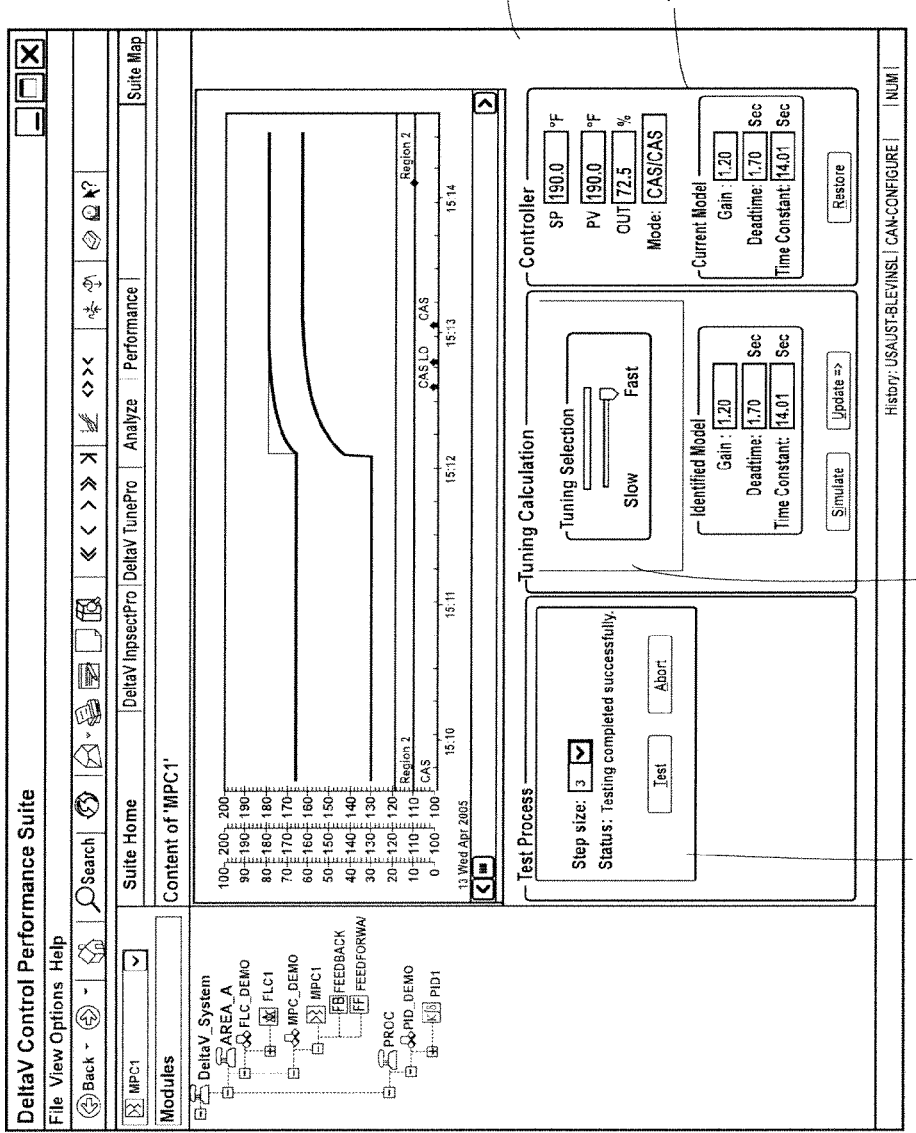

FIGS. 15 and 16 depict process model information for a recently identified model in connection with a fuzzy logic control block and an MPC block, respectively. To that end, display interfaces 190 and 192 provide respective graphical representations of the process model, along with a number of panels 192, 194, 196 and 198 to support testing, tuning calculations, controller parameter settings, tuning simulation, and tuning selection.

The terms "identifying," "identification" and any derivatives thereof are used herein in a broad sense in connection with the use of process models to include the creation of, generation of, and other processing to arrive at, either an entire process model, any one or more parameters to define it, or any other defining characteristics thereof.

Any of the above-described applications may be implemented as routines, modules or other components of one or more integrated applications. The disclosed arrangement of application functionality is provided merely for ease in illustration and is not indicative of the broad range of manners in which the functionality may be provided to an operator or other user. Furthermore, the above-described applications may be provided in varying form depending on user profile, context, and other parameters, as desired. For example, the display interface views generated for one user type (e.g., engineering) may differ in content and other ways from the views generated for a different user type (e.g., maintenance).

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it may be apparent to those of ordinary skill in the art that changes, additions or deletions may be made to the disclosed embodiments without departing from the spirit and scope of the invention.

The invention claimed is:

1. A method of controlling a process control system having a plurality of control loops, the method comprising the steps of:
    implementing a plurality of control routines to control operation of the plurality of control loops, respectively, the plurality of control routines comprising at least one non-adaptive control routine;
    collecting operating condition data in connection with operation of each control loop of the plurality of control loops; and,
    identifying a respective process model for each control loop of the plurality of control loops from the respective operating condition data collected for each control loop of the plurality of control loops.

2. The method of claim 1, further comprising the step of storing data indicative of the respective identified process models in a respective process model history for each control loop of the plurality of control loops.

3. The method of claim 1, further comprising the steps of:
    examining the operating condition data to detect a change therein; and,
    triggering the process model identifying step when the change is detected.

4. The method of claim 1, wherein the identifying step is performed in response to a user command to calculate a process model based on the collected operating condition data.

5. The method of claim 4, wherein the collected operating condition data is indicative of a response to an injected parameter change applied as a result of the user command.

6. The method of claim 1, wherein the operating condition data is indicative of on-line operation of a process controlled via the operation of the plurality of control loops.

7. The method of claim 1, further comprising the step of monitoring the respective process model identified for each control loop to evaluate control loop performance.

8. The method of claim 1, further comprising the step of analyzing the respective process model identified for each control loop to determine which control loops should utilize an adaptive control scheme.

9. The method of claim 1, further comprising the step of analyzing the respective process model identified for each control loop to diagnose control problems.

* * * * *

UNITED STATES PATENT AND TRADEMARK OFFICE
CERTIFICATE OF CORRECTION

| | |
|---|---|
| PATENT NO. | : 7,444,191 B2 |
| APPLICATION NO. | : 11/243862 |
| DATED | : October 28, 2008 |
| INVENTOR(S) | : John Caldwell et al. |

It is certified that error appears in the above-identified patent and that said Letters Patent is hereby corrected as shown below:

At Column 2, lines 38-39, "Unfortunately,.it" should be -- Unfortunately, it --.

At Column 17, line 52, "6f" should be -- of --.

Signed and Sealed this

Nineteenth Day of May, 2009

JOHN DOLL
*Acting Director of the United States Patent and Trademark Office*